US012809436B2

(12) United States Patent
Naserimojarad et al.

(10) Patent No.: US 12,809,436 B2
(45) Date of Patent: Nov. 24, 2026

(54) SYSTEMS AND METHODS FOR DEVICE OR DATACENTER MANAGEMENT THROUGH CODELESS PROGRAMMING

(71) Applicant: LOD Technologies Inc., Burnaby (CA)

(72) Inventors: Medi Naserimojarad, Vancouver (CA); Mostafa Shariat, Vancouver (CA)

(73) Assignee: LOD Technologies Inc., Burnaby (CA)

( * ) Notice: Subject to any disclaimer, the term of this patent is extended or adjusted under 35 U.S.C. 154(b) by 0 days.

(21) Appl. No.: 18/740,305

(22) Filed: Jun. 11, 2024

(65) Prior Publication Data

US 2025/0377702 A1 Dec. 11, 2025

(51) Int. Cl.
*G06F 1/26* (2006.01)

(52) U.S. Cl.
CPC .................................... *G06F 1/26* (2013.01)

(58) Field of Classification Search
None
See application file for complete search history.

(56) References Cited

U.S. PATENT DOCUMENTS 9,442,697 B2 9/2016 Miller
11,321,668 B2 5/2022 Rajwade et al.
11,704,095 B2 7/2023 Mani et al.
2009/0204382 A1* 8/2009 Tung .................... G06F 1/3203 703/21
2009/0231152 A1* 9/2009 Tung .................... G06F 1/206 340/660
2009/0309570 A1* 12/2009 Lehmann .................. G06F 1/26 323/318
2010/0235840 A1* 9/2010 Angaluri ............... G06F 9/5094 718/102
2010/0241329 A1* 9/2010 Fujimura .............. B60T 13/662 340/436
2012/0065802 A1* 3/2012 Seeber ............. H02J 13/00004 700/295
2012/0198246 A1* 8/2012 German ................ H04Q 1/136 713/300

(Continued)

FOREIGN PATENT DOCUMENTS

CN 115796549 A 3/2023
CN 116708524 A 9/2023

(Continued)

*Primary Examiner* — Danny Chan
(74) *Attorney, Agent, or Firm* — Own Innovation Inc.; James W. Hinton; Daniel B. Biggs

(57) ABSTRACT

Computer program product, systems, methods, and devices for controlling energy consumption of a datacenter and managing one or more devices are provided. The computer program product includes instructions for generating a display screen for programming one or more devices in the datacenter, the display screen configured to provide instructions on defining a rule by displaying an input signal type menu including one or more input signal types, a trigger criterion menu including one or more trigger criteria, an action menu including one or more actions for execution on the one or more devices, creating a defined rule by receiving an input signal type selected from the input signal type menu, a trigger criterion selected from the trigger criterion menu, and an action selected from the action menu, and commissioning the defined rule for execution on the one or more devices.

32 Claims, 9 Drawing Sheets

(56) References Cited

U.S. PATENT DOCUMENTS

| | | | | |
|---|---|---|---|---|
| 2012/0271472 | A1* | 10/2012 | Brunner | H04L 12/2825 700/295 |
| 2013/0073882 | A1* | 3/2013 | Inbaraj | G06F 1/3206 713/320 |
| 2013/0106749 | A1* | 5/2013 | Hosono | H04N 1/00411 345/173 |
| 2013/0339776 | A1* | 12/2013 | Jagadishprasad | G06F 9/5094 713/340 |
| 2014/0189399 | A1* | 7/2014 | Govindaraju | G06T 1/20 713/323 |
| 2017/0201425 | A1* | 7/2017 | Marinelli | H04L 41/12 |
| 2019/0258307 | A1* | 8/2019 | Shaikh | G06F 1/3206 |
| 2020/0026338 | A1* | 1/2020 | Maddukuri | G06F 1/28 |
| 2020/0285523 | A1* | 9/2020 | Guim Bernat | G06F 9/5044 |
| 2023/0007881 | A1* | 1/2023 | Patton | G06F 11/3003 |
| 2023/0114277 | A1 | 4/2023 | Deshmukh | |
| 2023/0222388 | A1* | 7/2023 | Cella | G06Q 30/018 706/12 |
| 2023/0393596 | A1* | 12/2023 | Santana | G05D 23/1951 |
| 2023/0394439 | A1 | 12/2023 | Zhou et al. | |
| 2023/0394448 | A1 | 12/2023 | Ognjanovic et al. | |

FOREIGN PATENT DOCUMENTS

| | | | |
|---|---|---|---|
| KR | 102621742 | B1 | 1/2024 |
| WO | 2020228063 | A1 | 11/2020 |

* cited by examiner

SYSTEMS AND METHODS FOR DEVICE OR DATACENTER MANAGEMENT THROUGH CODELESS PROGRAMMING

TECHNICAL FIELD

The present disclosure generally relates to programming device management systems and methods, and more particularly relates to systems and methods for codeless programming of device management systems.

BACKGROUND OF THE INVENTION

With the emergence of digitization, many facilities such as datacenters, industrial manufacturing facilities, and fuel production facilities are transforming methods of managing their devices and their energy consumption. Conventional device management and energy management systems often face numerous challenges, including fragmented data, lack of customized workflow automation, and inadequate responsiveness to dynamic and changing variables in managing devices. These systems typically suffer from prolonged development cycles and high maintenance costs, making them less responsive to the dynamic needs of modern enterprises. The implementation of low-code and no-code tools addresses these pain points by offering a more flexible, agile, and cost-effective alternative. For instance, these tools may advantageously integrate disparate data sources into a unified platform, providing real-time insights and comprehensive monitoring of energy consumption across various devices and systems. Additionally, such tools support the development of customizable early warning systems and predictive maintenance algorithms, significantly reducing potential safety hazards and improving energy efficiency.

Low-code and no-code tools are becoming indispensable for enterprises seeking to stay competitive in an increasingly data-driven market. They facilitate seamless integration with existing IT infrastructure, enhancing the overall user experience and reducing the time-to-market for new solutions. Moreover, these platforms empower facility managers to create targeted, scenario-specific energy management strategies that may adapt to changing market conditions and regulatory requirements. By leveraging the capabilities of low-code and no-code tools, facilities may achieve substantial cost savings, optimize energy usage, and contribute to broader sustainability goals.

SUMMARY

A computer program product is provided. The computer program product includes a computer readable storage medium storing computer executable instructions thereon that, when executed by a computer, perform the following operations for controlling energy consumption of a datacenter. Generating a display screen for programming one or more devices in the datacenter, the display screen configured to provide instructions on defining a rule by displaying an input signal type menu including one or more input signal types, a trigger criterion menu including one or more trigger criteria, and an action menu including one or more actions for execution on the one or more devices. Creating a defined rule by receiving an input signal type selected from the input signal type menu, a trigger criterion selected from the trigger criterion menu, and an action selected from the action menu. Commissioning the defined rule for execution on the one or more devices.

Commissioning the defined rule for execution may include receiving input signal values of the selected input signal type, monitoring the input signal values to determine that the input signal values meet the trigger criterion, and once the trigger criterion is met, dispatching action signals for executing the action on the one or more devices.

Commissioning the defined rule for execution may further include monitoring an execution state of the action on the one or more devices, determining that a first set of devices from the one or more devices has not executed the action, and dispatching the action signals to the first set of devices.

The one or more devices may be selected from one or more of computing servers of the datacenter, a cooling system of the datacenter, backup energy supplies of the datacenter, and energy generation, transmission, or distribution systems of the datacenter.

The defined rules may be configured to automate operating the one or more devices, operating the one or more devices including one or more of sourcing energy to the one or more devices, trading energy allocated to the one or more devices, adjusting energy consumption of the one or more devices, monitoring and/or maintaining the health or operating conditions of the one or more devices, monetizing energy allocated to the one or more devices, and complying with or executing a contractual agreement or an option agreement in relation to operating the one or more devices.

Receiving the input signal values may include receiving the input signal values pushed by an input signal source.

Receiving the input signal values may include sending a signal pull request to an input signal source.

The input signal type menu may include any one or more of uptime measurement signals, energy or power consumption signals, energy price signals, grid or microgrid condition signals, grid or microgrid dispatch signals, grid or microgrid demand signals, energy mix signals, coincidental peak signals, ancillary services signals, device health signals, device performance signals, and environmental impact signals.

The one or more devices may consume energy to generate a device product measured by a product signal, and the input signal type menu may include any one or more of the product signals, a product price signal, a product production cost signal, a product profit margin signal, a breakeven signal, and a breakeven efficiency signal.

A signal processing method menu, including one or more signal processing methods, may be displayed after receiving the selected input signal type, and creating the defined rule may further include receiving a signal processing method selected from the signal processing menu.

The signal processing method may include one or more of a frequency at which the input signal values are to be received, a sampling rate of the input signal values, receiving a continuous stream of the input signal values, receiving the input signal value intermittently or at certain time intervals, receiving the input signal values by sending a signal pull request, and receiving the input signal values by receiving a signal push request.

The trigger criterion menu may include any one or more of a time frame within which the input signal values are monitored, a signal condition, a signal threshold, a signal range, and an energy market for which values for the selected signal type are monitored.

The trigger criterion may include fulfilling the signal condition for a certain period of time, a certain count number, or a certain frequency.

The signal condition may include a conditional statement including an operand that compares values of the selected signal type with the signal threshold or the signal range.

The trigger criterion menu may include the occurrence of one or more events, each event from the one or more events including one or more of values of the selected signal type hitting the signal threshold or the signal range for a certain number of times or for a certain period of time, and the values of the selected signal type following a certain pattern.

The action menu may include any one or more of stopping operation of the one or more devices, starting operation of the one or more devices, adjusting power consumption by the one or more devices, adjusting a product production rate of the one or more devices, and generating an alert.

The stopping operation of the one or more devices may include one or more of hibernating the one or more devices, soft shutdown of the one or more device by the respective one or more devices or by an external controller, cutting off an input supply that causes production of the device product to stop, and hard shutdown of the one or more devices by cutting supply of power to the respective one or more devices.

The stopping operation of the one or more devices may further include recording a last state and a checkpoint of the one or more devices in a memory.

The starting operation of the one or more devices may further include recalling the last state and the checkpoint of the one or more devices from the memory.

The starting operation of the one or more devices may include one or more of resuming operation of the one or more devices, starting the one or more devices from full shutdown, re-establishing power supply to the one or more devices, and re-establishing the input supply to the one or more devices.

Adjusting the power consumption may include any one or more of adjusting the product production rate of the one or more devices, adjusting energy consumed by the one or more devices, adjusting a supply rate of the input supply to the one or more devices, cutting power supply to a device or a group of devices from the one or more devices, and hibernating a device or a group of devices from the one or more devices.

Adjusting the power consumption by the one or more devices may include adjusting the power consumption by the one or more devices to reach within a target power consumption range or threshold.

The target power consumption range may include one or more of an upper limit and a lower limit.

The target power consumption range may be associated with one or more of an individual device from the one or more devices, a plurality of devices from the one or more devices, all of the one or more devices, and a facility that provides power for the one or more devices.

Adjusting the product production rate by the one or more devices may include adjusting the product production rate by the one or more devices to reach a target product production range or threshold.

The target product production range may include one or more of an upper limit and a lower limit.

The target product production range may be associated with one or more of an individual device from the one or more devices, a plurality of devices from the one or more devices, all of the one or more devices, and a facility that provides power for the one or more devices.

The action menu may further include an action point menu, including one or more action points, and creating the defined rule may further include receiving an action point selected from the action point menu.

The one or more action points may include any one of an individual device from the one or more devices, a plurality of devices from the one or more devices, all of the devices from the one or more devices, and an external device connected to the one or more devices.

Dispatching the action signals may include dispatching the action signals to the selected action point.

The action menu may further include an action execution monitoring menu including one or more action execution monitoring options configured to prescribe a method to monitor an execution state of the action, and creating the defined rule may further include receiving an action execution monitoring option selected from the action execution monitoring menu.

The one or more action execution monitoring options may further include monitoring the execution state of the action continuously, with a certain frequency, or for a certain number of times.

Commissioning the defined rule for execution may further include monitoring the execution state of the action at least based on receiving an action execution monitoring option selected from the action execution monitoring menu.

The action menu may further include an action dispatching menu including one or more action dispatching options configured to prescribe a method of dispatching the action signals to the selected action point, and creating the defined rule may further include receiving an action dispatching option selected from the action dispatching menu.

The one or more action dispatching options may include a buffer time before dispatching the action signals, a ramp time for dispatching the action signals, a deadline for dispatching the action signals, or a deadline for completing execution of the selected action, and repeat dispatching the action signals for a certain number of times, within a certain time interval, if executing the action on the action point is not achieved, or until the action or the defined rule is overridden by a second action or a second defined rule.

Dispatching the action signals may further include dispatching the action signals to the selected action point at least based on receiving the action dispatching option selected from the action dispatching menu.

The action menu may further include an action attribute menu including one or more action attribute options configured to prescribe an attribute of the action, and creating the defined rule may further include receiving an action attribute option selected from the action attribute menu.

The one or more action attribute options may include an action execution duration indicating the duration at which the action is to be executed on the action point, an action execution frequency indicating the number of times the action is to be executed on the action point, an action execution rate indicating the rate at which the action is to be executed on the action point, and a follow-up action for execution after executing the action on the action point.

The action execution duration may be indicated by a certain timeframe or until the action or the defined rule is overridden by a second action or a second defined rule.

The action execution rate may include a change rate in the energy consumption of the action point, or a change in the product production rate, or the combination thereof.

The action execution rate may include a first change in a first group of devices from the action point and a second change in a second group of devices from the action point.

Commissioning the defined rule for execution may further include dispatching the action signals to the selected action point with an action attribute option selected from the action attribute menu.

The display screen may further display a priority menu including one or more priority criteria, and creating the defined rule may further include receiving a priority criterion selected from the priority menu.

The priority criterion may be a priority level selected from a list of priority levels.

The priority level may be denoted by a priority number, with the priority level indicated by ascending order with larger numbers having higher priority, or by descending order with smaller numbers having higher priority.

A first defined rule may be executed with a higher priority over a second defined rule if the first rule and the second rule have a similar priority criterion but the first rule is defined to cause a reduction in energy consumption of the one or more devices.

A first defined rule may be executed with a higher priority over a second defined rule if the first defined rule and the second defined rule have a similar priority criterion but the first defined rule is defined to cause an increase in energy consumption of the one or more devices.

The display screen may further include a chart area indicating input signal values over time, and creating the defined rule may cause the processor to display the defined rule on the chart area.

The display screen may further include a chart area indicating input signal values over time, and the chart area may further display the executed action once the action of the defined rule is executed.

The input signal type menu, the trigger criterion menu, and the action menu may be dynamically updated.

A system to control energy consumption of a datacenter is provided, the datacenter including one or more energy consuming devices, the system including a controller operably connected to the one or more energy consuming devices, a user interface operably connected to the controller and configured to display instructions to define a rule, the instructions including an input signal type menu including one or more input signal types, a trigger criterion menu including one or more trigger criteria, and an action menu including one or more actions for execution on the one or more energy consuming devices, receive selection inputs, the selection inputs including an input signal type selected from the input signal type menu, a trigger criterion selected from the trigger criterion menu, and an action selected from the action menu. The controller receives the selection inputs from the user interface to generate a defined rule and commissions the defined rule for execution on the one or more energy consuming devices.

The controller may commission the defined rule for execution by receiving input signal values of the input signal type, monitoring the input signal values to determine that the input signal values meet the trigger criterion, and once the trigger criterion is met, dispatching action signals for execution on the one or more energy consuming devices.

Commissioning the defined rule for execution may further include monitoring an execution state of the action on the one or more energy consuming devices, determining that a first set of devices from the one or more energy consuming devices has not executed the action, and dispatching the action signals to the first set of devices.

The one or more energy consuming devices may be selected from one or more of computing servers of the datacenter, a cooling system of the datacenter, backup energy supplies of the datacenter, and energy generation, transmission, or distribution systems of the datacenter.

The defined rules may be configured to automate operating the one or more energy consuming devices, operating the one or more energy consuming devices including one or more of sourcing energy to the one or more energy consuming devices, trading energy allocated to the one or more energy consuming devices, adjusting energy consumption of the one or more energy consuming devices, monitoring and/or maintaining the health or operating conditions of the one or more energy consuming devices, monetizing energy allocated to the one or more energy consuming devices, and complying with or executing a contractual agreement or an option agreement in relation to operating the one or more energy consuming devices.

The controller may include a processor that executes the computer program product hereinabove described.

The processor may execute a first computer program and a second computer program, the first and second computer programs including the computer program product hereinabove described, and the first computer program may manage a first group of devices from the one or more energy consuming devices, and the second computer program may manage a second group of devices from the one or more energy consuming devices.

The system may further include an auxiliary controller coupled to the controller, the auxiliary controller configured to execute in parallel with the controller or replace the controller automatically or manually in case the controller fails.

The controller may execute the first program and manage the first group of devices and the auxiliary controller may execute the second program and manage the second group of devices.

One or more of the controller and the auxiliary controller may be local controllers and may be within the physical premises of the datacenter.

One or more of the controller and the auxiliary controller may be remote controllers and may be physically remote from the premises of the datacenter.

Dispatching the action signals for execution on the one or more energy consuming devices may include dispatching the action signals to a second controller for execution on the one or more energy consuming devices.

The controller may include a device management module coupled to the one or more energy consuming devices or to a local controller connected to the one or more energy consuming devices, or a combination thereof.

The controller may further comprise a data collection module configured to receive the input signal values.

A method to control energy consumption of a datacenter is provided, the datacenter including one or more energy consuming devices, the method including displaying, using a user interface, instructions to define a rule, the instructions including an input signal type menu including one or more input signal types, a trigger criterion menu including one or more trigger criteria, and an action menu including one or more actions for execution on the one or more energy consuming devices, receiving, by the user interface, selection inputs, the selection inputs including an input signal type selected from the input signal type menu, a trigger criterion selected from the trigger criterion menu, and an action selected from the action menu, receiving, by a controller, the selection inputs from the user interface to generate a defined rule, and commissioning, by the controller, the defined rule for execution on the one or more energy consuming devices.

The method may further include commissioning the defined rule for execution by receiving, at the controller, input signal values of the input signal type, monitoring, at the controller, the input signal values to determine that the input signal values meet the trigger criterion, and once the trigger criterion is met, dispatching action signals, by the controller, for execution to the one or more energy consuming devices.

Commissioning the defined rule for execution may further include monitoring an execution state of the action on the one or more energy consuming devices, determining that a first set of devices from the one or more energy consuming devices has not executed the action, and dispatching the action signals to the first set of devices.

The one or more energy consuming devices may be selected from one or more of computing servers of the datacenter, a cooling system of the datacenter, backup energy supplies of the datacenter, and energy generation, transmission, or distribution systems of the datacenter.

A computer program product including a computer readable storage medium storing computer executable instructions thereon that, when executed by a computer perform the following operations for managing one or more devices is provided. Generating a display screen for programming the one or more devices, the display screen configured to instruct the user to define a rule by displaying an input signal type menu including one or more input signal types, a trigger criterion menu including one or more trigger criteria, an action menu including one or more actions for execution on the one or more devices. Creating a defined rule by receiving an input signal type selected from the input signal type menu, a trigger criterion selected from the trigger criterion menu, and an action selected from the action menu. Commissioning the defined rule for execution on the one or more devices.

Commissioning the defined rule for execution may include receiving input signal values of the selected input signal type, monitoring the input signal values to determine that the input signal values meet the trigger criterion, and once the trigger criterion is met, dispatching action signals for executing the action on the one or more devices.

Commissioning the defined rule for execution may include monitoring an execution state of the action on the one or more devices, determining that a first set of devices from the one or more devices has not executed the action, and dispatching the action signals to the first set of devices.

The one or more devices may be selected from one or more of computing servers of a datacenter, hydrogen electrolysis devices, water, oil, gas, chemical processing and disposal facilities or sewage systems, battery systems including electric vehicle charging, utility scale batteries, and/or grid-connected batteries, heating, ventilation, and air conditioning (HVAC) or heating systems, actuators, conveying systems, devices in a production facility, and devices in a power generation, transmission, and distribution unit.

The one or more devices may include a plurality of devices at the same physical location.

The one or more devices may include a plurality of devices at different physical locations.

BRIEF DESCRIPTION OF THE DRAWINGS

In the following, embodiments of the present disclosure will be described with reference to the appended drawings. However, the embodiments of the present disclosure are not limited to the arrangements shown in the drawings, which are exemplary and not exhaustive.

DETAILED DESCRIPTION

Figure 1:
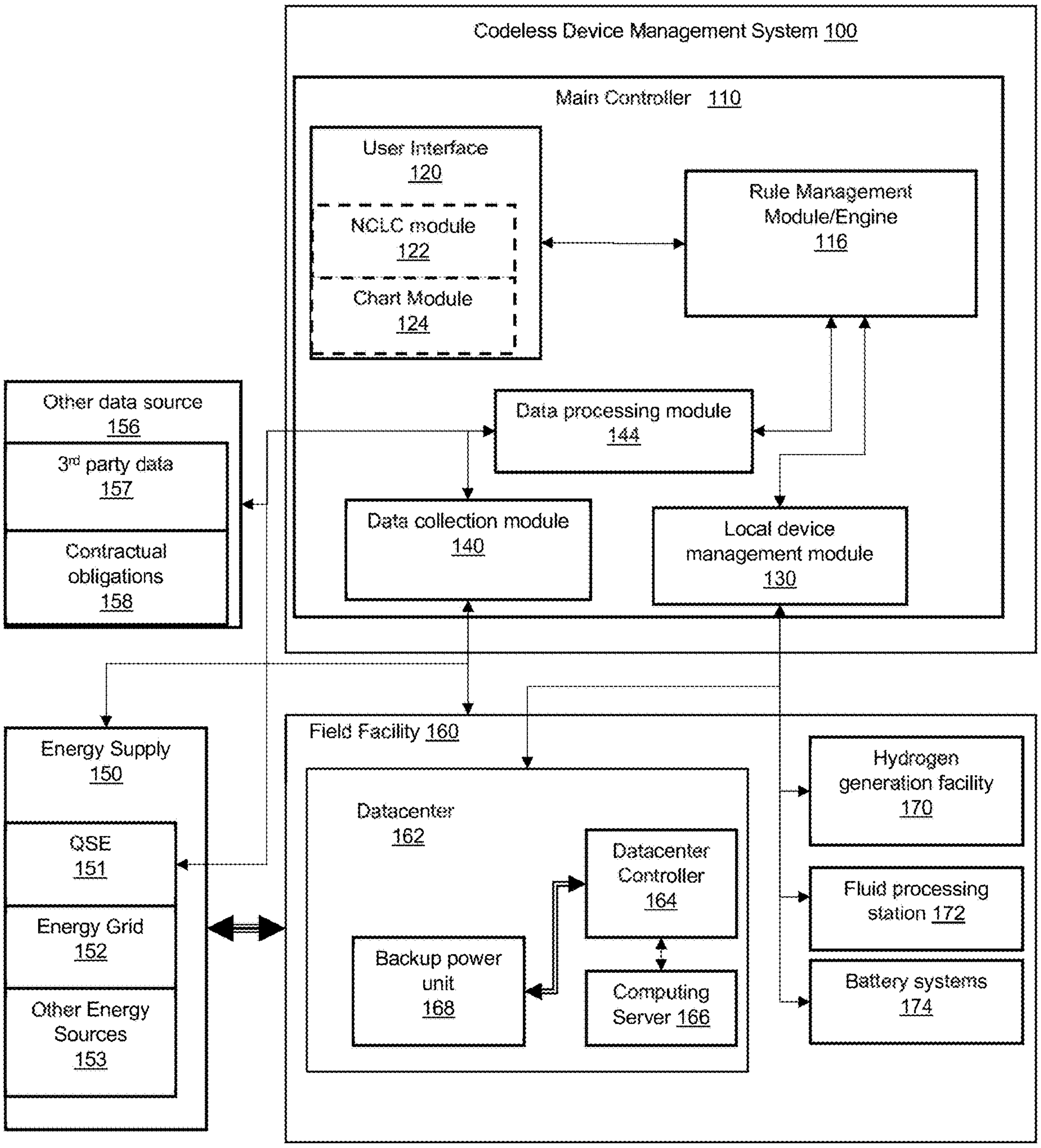
FIG. 1 is a block diagram showing a codeless device management system, according to an embodiment.

In the present disclosure, the bolded terms shall have the meanings defined hereinbelow except where context indicates otherwise:

Compute power refers to the capability to perform or conduct computation or a computing task such as data processing (including but not limited to data ingestion, data cleaning, data transformation, data encryption, data decryption, data validation, data analysis, and data visualization), hosting, developing, and training compute models (including but not limited to data models, simulation models, mathematical models, artificial intelligence models, neural network models, and large language models), tuning compute models, deploying and using the compute models, executing parallel computing processes, running simulations such as Monte Carlo simulations, graphical simulations, and rendering, and executing audio processing and cryptocurrency mining processes.

Compliance obligation(s) may refer to both contractual agreements, such as customer service agreements and energy agreements discussed hereinbelow, and government or industry regulations, such as data privacy and environment, social, governance (ESG) regulations.

Locational marginal pricing (LMP) is a method of pricing wholesale electric energy that reflects the value of electric energy at different locations, accounting for the patterns of load, generation, and the physical limits of the transmission system. LMP may be used in contrast with Real-time market pricing (RTMP) where the prices reflect immediate change in a market. LMP may be averaged over various timeframes, for example LMP-5 mins or LMP-15 mins reflect energy prices averaged over the past 5 minutes or past 15 minutes, respectively. While some energy markets use an LMP method, other markets may use a different method for pricing energy or may use a similar method but use a different name for the method other than LMP.

Compute models or computational models may refer to data, simulation, physics, mathematical, neural network, protein folding, and/or forecasting models that use computer programs and data to simulate and study complex systems using mathematics, physics, and computer science. A compute model includes numerous variables that characterize the system being studied.

Uptime refers to a period of time within a time interval, which a device has been up and running and is consuming energy. Uptime is usually measured by a percentage of the total time or nominal time a device is or is configured to be up and running. However, in some cases, uptime may be measured by other metrics such as a representative energy consumption level (e.g., the wattage of consumption of the device representing its uptime). Grid or microgrid dispatch signals refer to commands dispatched by a grid or microgrid operator or a qualified grid scheduling entity or qualified scheduling entity (QSE). Scheduled Action signals refer to events and actions for whose execution a facility is responsible. For example, if a facility has been awarded to participate in an ancillary service program, it may not curtail energy consumption in the specified time window as part of its commitment unless a dispatch signal is received from the grid. The facility is responsible to prevent curtailing its energy consumption in the specified time window to prevent penalties or losing entitlement to the reward. In other words, grid dispatch signals are dispatched by the grid (usually without prior notice to the facility) while the schedule action signals are prescheduled events set by the facility according to an obligation or preference.

Environmental impact signals refers to signals that indicate a measure of environmental impacts from operating a facility or a device or a group of devices, such as metric tonnes of direct or indirect greenhouse gas emissions, liters of produced wastewater, and metric tonnes of produced waste material.

Energy mix refers to the ratio of energy sourced from various sources, and particularly refers to a ratio of energy sourced from renewable energies to total sourced energy.

Coincidental peak refers to an indication of peak energy demands across a region. A coincidental peak signal may be indicated by a ratio of existing demand over peak realized or forecast demand.

A device product refers to a primary product generated by a device and is the aim of operating the device. The amount of the device product is measured by a product signal. For example, the device product of a cryptocurrency miner is the hash rate or hashing power that is priced by a hash price and is sold in exchange for the cryptocurrency it mines (e.g., Bitcoin). In a further example, the device product of a GPU is computational processing carried out by the GPU and is measured by various metrics depending on the type of computational process (e.g. the number of tokens or generated outputs by a large language model). In a still further example, the device product of a hydrogen electrolysis device is the amount of produced hydrogen measured in metric tonnes or per unit time. In a still further example, the device product of an actuator is the amount of power or work generated by the actuator and measured by kilowatts or kilojoules, respectively. In a still further example, the device product of a reactor is the volume or mass of primary material processed at the output of the reactor. In the foregoing examples, the product signal respectively includes the amount of cryptocurrency mined, the number of generated outputs by the large language model (e.g. number of tokens), the metric tonnes of hydrogen produced, the kilowatts or kilojoules produced by the actuator, and the processed volume or mass from the reactor. In some cases, the product signal may also include the monetary value associated with these product signals. In other cases, this monetary value of the product signal is indicated by a product price signal. The costs associated with producing the products may be indicated by a product production cost signal. The difference between the product price signal and the product production cost signal may be indicated by a product profit margin signal. A breakeven energy price signal may indicate an energy price (e.g. in $ per MW·hr) below which it makes economic sense to consume energy to produce the device product. A breakeven efficiency signal may indicate the amount of energy consumed per device product produced at which it is determined to produce the device product (e.g., according to economics or economic sense, viz., whether it will be profitable to produce the device product according to the energy consumed at a specific energy price). For example, the breakeven efficiency of a cryptocurrency miner may be measured by joule per terahash, which is the amount of energy consumed to compute one terahash.

An input supply to a device refers to materials, energy, and/or processes that are provided as input to the device to produce the device product. For example, in the case of computing server devices, the input supply may include input workloads or computing tasks that are specified for the computing server to produce an output. Without input computing tasks, the computing server may work in idle mode. In another example, for a hydrogen electrolyzing device, the input supply may be or may include water or methane provided to the electrolyzer device. For most devices, input power or energy (e.g., electric energy, hydraulic energy, or chemical energy), particularly electrical energy, is an input supply. Without the input supply or input supplies, the device may not be able to produce the device product.

Referring now to FIG. 1, a schematic diagram representing a codeless device management system 100 is shown, according to an embodiment. The single thread connector lines in FIG. 1 represent data signal communications, and multi-thread connector lines represent energy or power flow connections. The codeless device management system 100 is configured to provide no-code, low-code, or codeless device programming tools and user interface for a user to manage one or more devices in a field facility 160. The user may be a group of users. The field facility 160 may include any energy consuming facility with one or more energy consuming devices. Examples of the field facility include, but are not limited to, a datacenter 162, a hydrogen production facility 170, and a water, fossil fuel, or fluid processing station 172 (e.g., chemical processing and disposal facilities such as sewage systems, chemical refinery systems), a battery system 174 (e.g. system with power banks and electrical energy storage units), a power generation station, a power distribution station, a power transmission station, and any production facilities (such as material mining facilities, cement production factories, food production facilities, pharmaceutical production facilities, and biosynthesis production facilities). Examples of one or more devices include, but not limited to, computing servers 166, hydrogen electrolysis devices, energy storing devices (e.g., electric vehicle chargers, utility scale batteries, grid-connected batteries), heating, ventilation, and air conditioning units, electrical motors and actuators more generally (e.g., in fans and pumps, conveyors), power distribution units, power regulating units, power generating devices, and power transmitting devices.

The codeless programming functionality enables a user to program or define rules for controlling the operation of the one or more devices in the field facility 160, particularly, with a view to controlling the energy consumption of the one or more devices. In an embodiment, the one or more devices may include one or more groups of devices and each group of devices may be located in a different physical location from the other group within one field facility 160 or a different field facility.

The codeless device management system 100 includes a main controller 110. The main controller 110 may be a computer on a cloud computer, a computer on an internet of things (IoT) gateway, a computer on an edge computer, or a computer or controller local to the facility 160. The main controller 110 further includes a rule management module 116 configured to generate and store rules defined by the codeless programming functionality. The rule management module 116 is operably in communication with a user interface unit 120 (e.g. a graphical user interface) which is configured to display an NCLC module 122 and receive inputs from the user in relation to defining a rule for controlling the one or more devices of the field facility 160. The NCLC module 122 provides a set of menus and options to the user to enable codeless programming (i.e., by defining rules) of the one or more devices for the user without the user writing or providing any code (e.g., not even a single line of code). The NCLC module 122 may further include instructions to guide the user through programming of the one or more devices (i.e., defining rules). In an embodiment, multiple users or a group of users collaboratively or individually use the NCLC module for codeless programming of the one or more devices.

Figure 1A:
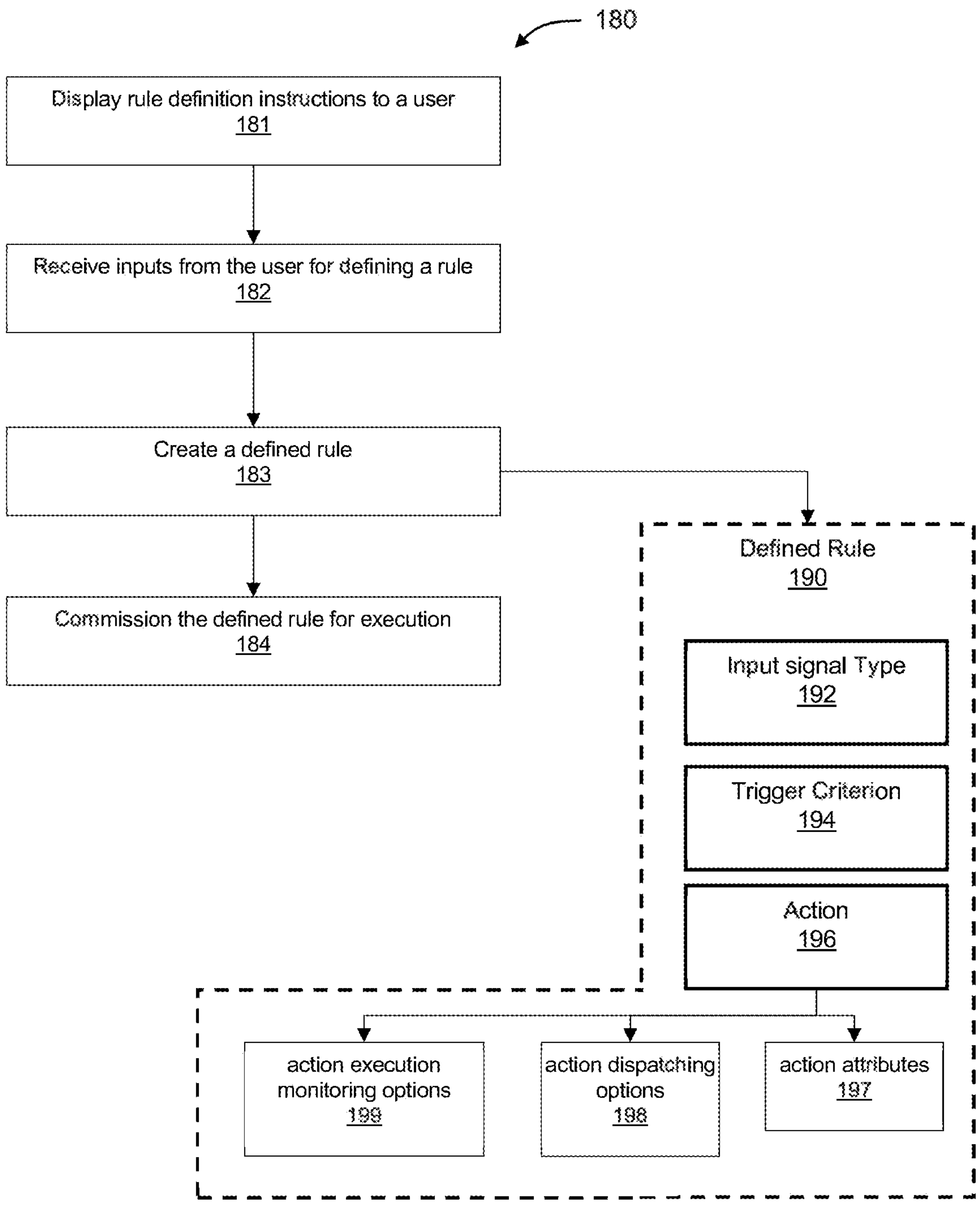
FIG. 1A is a flowchart of a method of directing the codeless device system of FIG. 1 for creating a defined rule, according to an embodiment.

Referring now to FIG. 1A, a flowchart of a method of directing the codeless device system of FIG. 1 for directing the main controller 110 for generating a defined rule 190 is shown at 180. The main controller 110 displays (or generates a display screen of) rule definition instructions to the user at 181, through the user interface 120 and more particularly using the NCLC module 122. At block 182, the main controller 110 receives user inputs in relation to the rule definition instructions displayed to the user at block 181. At block 183, the user inputs received at block 182 are used by the main controller 110, and more particularly, the rule management module 116, to create the defined rule 190. The defined rule 190 includes an input signal type 192, a trigger criterion 194, and an action 196 for actioning on or by the one or more devices. The input signal type 192 indicates a signal type based on which the defined rule 190 determines whether the trigger criterion is met. At block 184, the main controller 110 commissions the defined rule 190 for execution. Commissioning the defined rule 190 for execution means commanding a controller (the main controller 110 or another controller) to follow the instructions of the defined rule 190. In other words, the defined rule 190 instructs a controller (e.g., the main controller 110, a local controller 164) to monitor or track values associated with the signal type 192 and execute the action 196 once the values associated with the signal type 192 meet the trigger criterion 194. In order to execute the action 196, the controller (e.g. the main controller 110, the local controller 164) may send an action dispatch signal to another controller, to the one or more devices, or to a device external to the one or more devices (e.g., power distribution units). In an embodiment, the input signal type 192 is selected from one or more of the following signal types: uptime measurement signals, energy or power consumption signals, energy price signals, grid or microgrid condition signals (e.g., grid frequency, voltage amplitude, grid load), grid or microgrid dispatch signals, grid or microgrid demand signals, energy mix signals, coincidental peak signals, ancillary services signals, scheduled action signals, and environmental impact signals. The input signal type may further include any one or more of product signals, product price signals, product production cost signals, profit margin signals, breakeven signals, and breakeven efficiency signals. The input signal type may further include device health signals (e.g., device health status, battery health levels, component life cycle levels), device performance or operational condition signals (e.g., device temperature, device error rate, device uptime, device productivity), and device maintenance signals (e.g., device maintenance or error codes).

The action 196 may be or may include actions for execution by the device itself such as overclocking or underclocking the processor of the device or increasing speed of a fan. Alternatively, the action 196 may be or may include actions for execution by external devices (such as a power management unit, facility cooling or heating systems, or external controllers) to the device. Such actions may include cutting off power to the device, changing the environment in which the device operates (e.g., reducing the temperature at which computer servers are working). The action 196 may be or may include actions for execution by an individual device, a batch of devices, or all devices from the one or more devices. The defined rule 190 may be related to executing the action 196 on devices within one facility, or devices located in different facilities in different physical locations. In an embodiment, the action 196 includes sending a notification or alarm to a user once the trigger criterion 194 is met, and the action 196 does not include an action on the device.

The defined rule 190 may include further instructions for an action attribute 197 (i.e., an attribute associated with the action 196, such as the duration and frequency of the action), an action dispatching option 198 (i.e., an option related to how the action 196 should be communicated to a device, such as a buffer time before dispatching the action command for execution, or a deadline for having the action 196 executed by a device), and an action execution monitoring option 199 (i.e., if the execution state of the action 196 should be monitored and if so, the method to monitor the execution status). The action execution monitoring option 199 may help monitor the execution state of the action 196 and enable a closed-loop action execution.

Referring back to FIG. 1, the values related to an input signal type 192 are collected by a data collection module 140 of the main controller 110. The data collection module 140 receives data from various sources such as data received from energy supply 150 (e.g., energy price, events happened or happening in an energy grid 152, commands dispatched by a qualified scheduling entity (QSE) 151), data received from the field facility 160 (e.g., data received from the local controller 164, data received from monitoring sensors 340 (see FIG. 3A)), and data received from other sources 156 such as 3rd party data 157 (such as data from a weather station) and contractual obligation data 158.

The data received at the data collection module 140 may further include data related to agreements and contractual obligations between the field facility 160 and an external entity such as the energy supply 150, a government, or a $3^{rd}$ party. In an embodiment, the field facility 160 has an energy agreement with one or more authorities managing the energy supply 150 (e.g., the QSE 151), or any other external service providers administering energy sourcing to the facility 160. The energy agreement may include power blocks purchased from the energy grid 152, a power purchase agreement (PPA) between the facility 160 and other energy sources 153 (e.g., a behind-the-meter (BTM) energy supplier), a virtual PPA (VPPA), an energy hedge agreement with a non-energy grid counterparty to manage the financial risk in energy cost fluctuations, or incentive program agreements such as ancillary services and demand response program agreements, introduced by energy grid authorities, for example, to support frequency regulation, voltage regulation, and/or balancing supply and demand in the energy grid 152.

Moreover, the energy agreement may include programs that allow the facility 160 to trade allocated energy or flow excess energy generated from a co-located BTM supply or a backup power unit 168 to the energy grid 152 for a benefit such as monetary incentives.

Through any of these energy agreements, the facility 160 may be incentivized or have the option to stop consuming energy, the option to sell back energy to the energy grid 152, sell excess energy to the Energy Grid 152, sell the option to purchase or use energy to the energy grid 152 or another interested entity, cut energy consumption during certain time periods, or commit to consume certain amounts of energy in certain times. A person skilled in the art may be familiar with various types of energy agreements that could exist between the energy grid 152 and the facility 160.

In an embodiment, the energy agreement is an energy option agreement which is an agreement between the energy grid 152 and the facility 160, and associated with the delivery of energy to the facility 160. As part of the energy option agreement, the facility 160 (or the operator or contracting agent for the facility 160 and/or a semi-automated and/or automated control system associated with the facility 160—such as the datacenter controller 164) provides the energy grid 152 with the right, but not obligation, to reduce the amount of energy delivered to the datacenter 162 up to an agreed amount of energy during an agreed upon time interval. In order to provide the energy grid 152 with this option, the datacenter 162 uses at least the amount of energy subjected to the option (e.g., a minimum energy threshold). For instance, the facility 160 may agree to use at least 1 MW of energy from the energy grid 152 at all times during a specified 24-hour time interval to provide the energy grid 152 with the option of being able to reduce the amount of energy delivered to the load by any amount up to 1 MW at any point during the specified 24-hour time interval. The facility 160 may grant the energy grid 152 this option in exchange for a monetary consideration such as receiving energy at a reduced price and/or monetary payments if the option is exercised by the energy grid 152.

The foregoing energy agreements may be key factors in controlling the one or more devices of the facility 160 and thus the terms of such agreements may be introduced as rules using the codeless device management system 100, in a format similar to format represented by the defined rule 190, for automated implementation of the terms in the energy agreements. The defined rules may be commissioned by the rule management module 116 to embed decision-making for the facility 160 on when and how to consume energy to comply with the energy agreements, or make the most profits from the mentioned monetary incentives, for example.

The codeless programing functionality introduced in this disclosure may be leveraged to define rules representing the terms of the energy agreements and thereby streamlining or automating execution of agreement terms without manual intervention. For example, a rule 190 may be defined identifying device uptime as the input signal type 192. The trigger criterion 194 may include monitoring the device uptime during a 24-hour time window and generating a trigger signal if the device uptime, for example, reaches 80% (which may be equivalent to an average of 1 MW of power consumed over the period of measurement or a total of 1 MW·h of energy consumed over the measurement period). The action 196 may include sending a start or ramp-up command to the device to ramp up uptime and energy consumption by the device and ensure uptime of above 80%.

Figure 3A:
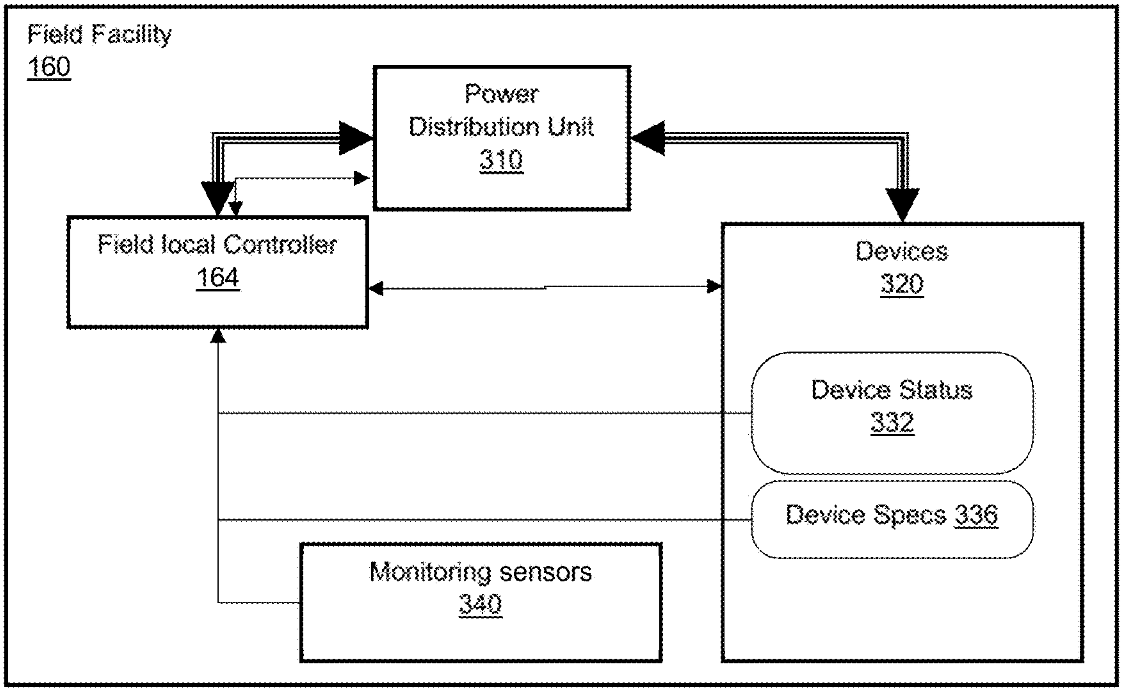
FIGS. 3A and 3B are schematic diagrams showing system architecture of a facility of FIG. 1, according to respective embodiments.

The data received from a field facility 160 may include data related to devices 320 (as shown in FIG. 3A) in the field facility 160 (e.g., devices energy consumption data, devices product data, devices health, devices operational conditions), environmental impacts such as GHG emissions produced due to operating devices 180, operational availability and capacity data of the field facility 160, and compliance to contractual agreements (e.g., customer service agreements) and certain regional, federal, or international regulations such as environmental, social, and governance (ESG) regulations, data privacy, data security, or data hosting guidelines such as GDPR, HIPAA, SOC2, and PCI guidelines, that are met by the field facility 160 (particularly in case the facility 160 is or includes the datacenter 162 executing computing tasks).

In the case of the datacenter 162, the data of the field facility 160 may further include costs or prices for performing various types of computational processes or data storage and/or latency in communication with the datacenter 162. The compute power cost generally includes a computing cost and an energy cost, among other costs such as administrative costs including service agreement costs, client onboarding costs, and costs related to allocating human and capital resources for the period of executing a computing task. The computing costs may further include equipment costs (such as hardware CPU, GPU, and memory cost and operating system or software to operate the hardware), and equipment depreciation cost. The energy cost may include the price for power distributed through regional and national electric power grids, grid balancing costs, ancillary services costs, and may further include generation, administration, transmission & distribution ("T&D") costs.

The data received at the data collection module 140 may be input signal values, which may be frequently received at the data collection module 140 as data pushed to the data collection module 140, or may be input signal values received due to a data pull request by the main controller 110.

The data collection module 140 may use input signal values in raw format and as received or may send them for further processing in a data processing module 144 before communicating them to the rule management module 116.

The main controller 110 further includes a local device management module 130 in communication with the rule management module 116 and local devices in the field facility 160. The local device management module 130 may be configured to receive defined rules 190 from the rule management module and commission the defined rules 190 to the devices within the field facility 160. In an embodiment, the local device management module 130 provides specification and configuration data from devices within a field facility 160 to the rule management module 116. Such specification and configuration data may include but is not limited to device serial or identification numbers, a list of available actions on the device, action capacity of each device, and/or health and performance signals about each device.

The rule definition instructions that are displayed to a user by the main controller 110 through the user interface 120 may be determined or updated dynamically by the input data to the main controller (e.g., type of data sources connected to the main controller, type of agreements, type of connected devices, etc.). In an embodiment, the displayed instructions are automatically updated in the NCLC module 122.

Figure 1B:
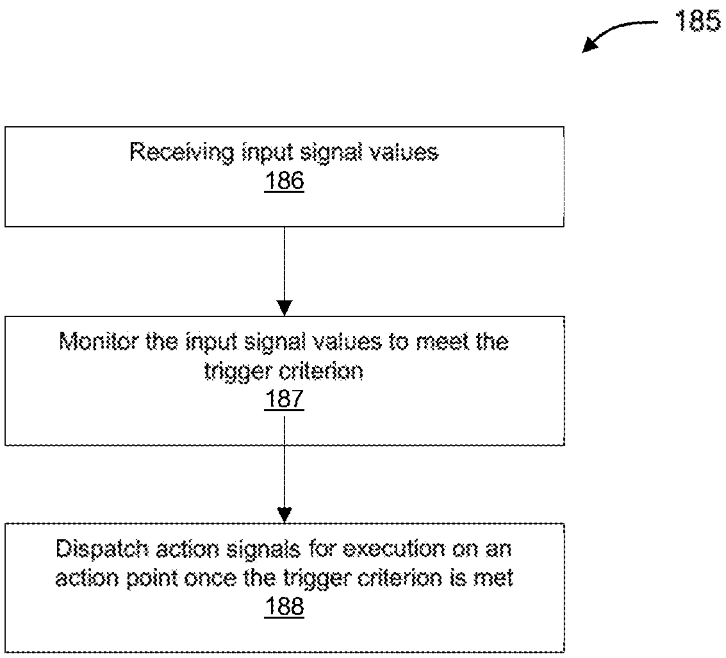
FIG. 1B is a flowchart of a method of directing the codeless device system of FIG. 1 for commissioning a defined rule, according to an embodiment.

As described above with respect to FIG. 1A, once a defined rule 190 is generated, such generated defined rule 190 is commissioned for rule execution at block 184. Referring to FIG. 1B, a flowchart of a method of directing the codeless device system of FIG. 1 for directing a controller (such as the main controller 110 or the datacenter controller 164) for commissioning a rule for execution is shown at 185, according to one embodiment. The controller receives input signal values at block 186, according to the specified input signal type 192 of the defined rule 190. The input signal values may be received from the data collection module 140 or the data processing module 144. At block 187 the controller monitors or tracks the received input signal values to determine whether the trigger criterion 194 is met. The controller may be considered to monitor the input signal values and determine that the trigger criterion 194 is met. At block 188, the controller dispatches action signals for executing the action 196 once the trigger criterion 194 is met. Besides the action 196, the dispatched action signals may further include action attributes 197, action dispatching options 198, and the action execution monitoring options 199, in accordance with prescribed instructions in the defined rule 190. In an embodiment, the action dispatching options 198 and the action execution monitoring options 199 are not part of the dispatched action signals, but are rather instructions for the controller and to be executed by the controller rather than target devices. The blocks in method 185 may all be carried out by a single controller. Alternatively one or more blocks may be distributed across a plurality of controllers.

According to another embodiment of method 185, at block 188, before dispatching action signals, the controller monitors the execution state of previously dispatched actions or monitors the status of devices. Accordingly, the controller may only dispatch action signals to devices that have a different state than the intended target state aimed by the action 196. For example, if the action 196 is to turn off a plurality of devices, the controller may only dispatch action signals to devices that are not already turned off. This extra step before dispatching action signals may result in reduced communication resources such as communication bandwidth.

Figure 2:
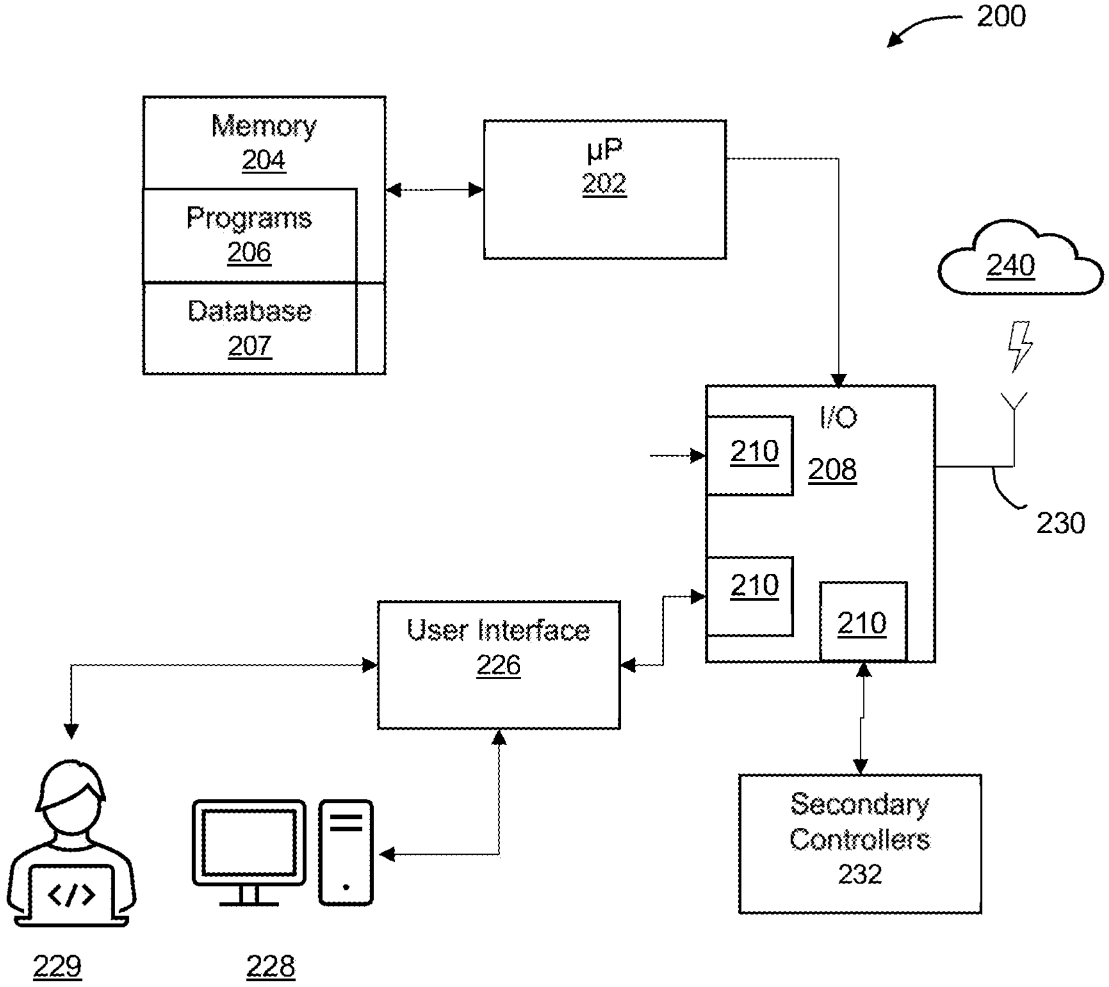
FIG. 2 is a block diagram of a processor circuit for implementing the main controller of the codeless device management system of FIG. 1, according to an embodiment.

Referring now to FIG. 2, a block diagram depicts an implementation of a controller 200. The controller 200 may be an implementation of the main controller 110 or the local controller 164. The controller 200 may be implemented using an embedded processor circuit such as a Linux-operated computer.

The controller 200 includes a microprocessor 202. The controller 200 further includes a memory 204 for storing programs 206 and databases 207, and an input output (I/O) 208, both of which are in communication with the microprocessor 202. The memory 204 stores various programs 206 such as lines of code that, when loaded and executed by the microprocessor, cause the main controller 110 to go through instructions provided in the methods 180 and 185, for example. The programs 206 may further cause the main controller 110 to receive data through data collection module 140, process data using data processing module 144, generate displays and user instructions through the GUI 120, and communicate commands and data to and from the field facility 160 through the local device management module 130. The database 207 may include data stored over time in the memory 204 related to collected and processed data from data collection module 140 and the data processing module 144 and may further include historical data for defined rules and their execution history. The I/O 208 includes a wireless interface 230 (such as an IEEE 802.11 interface) for wirelessly receiving and transmitting data communication signals between the controller 200 and a network 240. The I/O 208 further includes a wired network interface 210 (such as an Ethernet interface) for connecting to a wired network that may include a secondary controller 232. For example, where the controller 200 is an implementation of the main controller 110, the secondary controller 232 may be an implementation of the local controller 164. The secondary controller 232 may be in communication with the controller 200 through the wireless network 240. The controller 200 may be in data communication with the field facility 160 (and the devices within it), the energy supply 150 and the other data sources 156, through the wireless or wired networks. In some embodiments, the controller 200 may further include a power supply unit (not shown in Figures) which is connected to the microprocessor 202 and an external power supply (e.g. energy grid, battery) and is configured to allow the controller 200 to regulate power consumption to devices that are connected to the controller 200. The I/O 208 may further be in communications with a user interface 228, which facilitates interactions between the controller 200 and a user 229. The user interface 228 may be the graphical user interface 120, which includes the NCLC module 122 and the chart module 124. In an embodiment, the microprocessor 202 may load and execute a plurality of programs 206 at the same time. For example, the microprocessor may execute two versions of rule execution procedures (e.g., the method 185) simultaneously while each version is directed toward managing a distinct group of devices. For example, the microprocessor may execute a first instance and a second instance of method 185, with the first instance configured to control a first group of devices while the second instance is configured to control a second group of devices. Both program instances may be executed in parallel and facilitate executing distinct or similar defined rules on each group of devices.

Figure 3B:
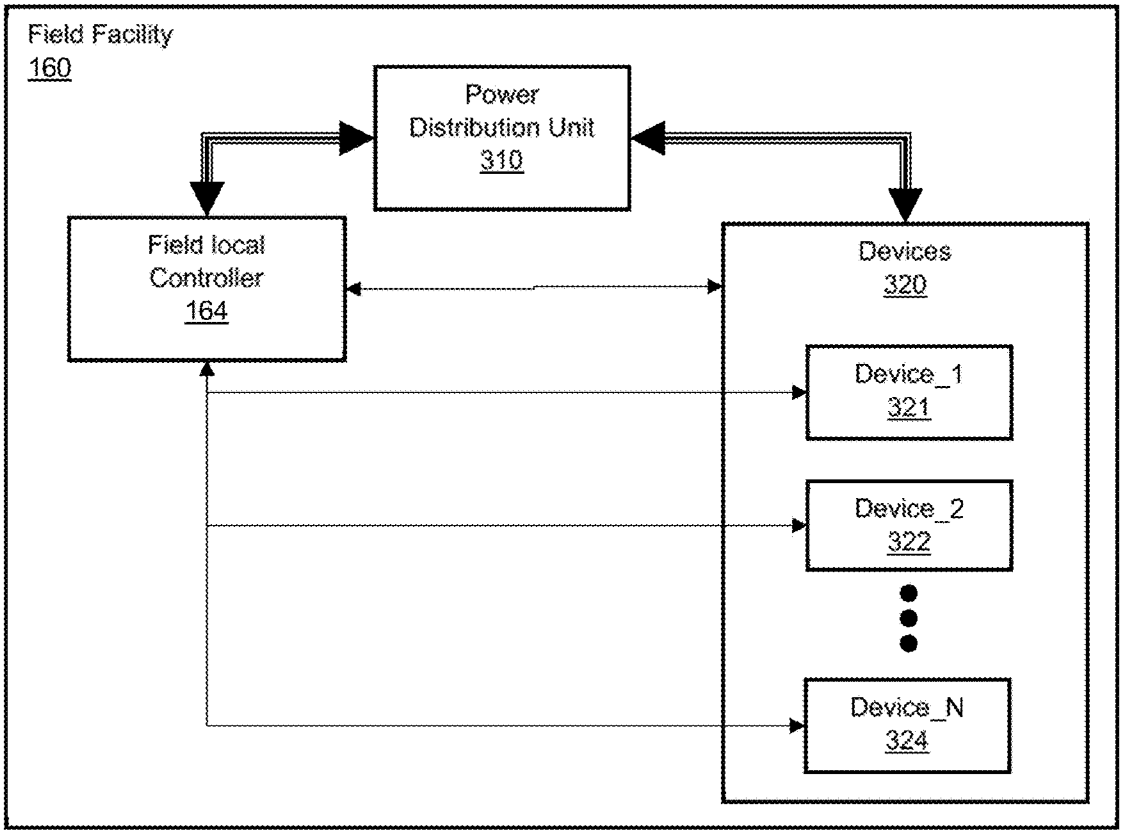

Referring now to FIGS. 3A and 3B, shown therein are schematic architectures of the field facility 160, according to respective embodiments. The single thread connector lines in FIGS. 3A and 3B represent data signal communications and multi-thread connector lines represent energy or power flow connections. The field facility 160 may be or may include any energy consuming facility or a facility with energy consuming devices 320. The field facility 160 may be a datacenter in which the devices 320 are computing servers configured to perform computational processes and data storage tasks. The computing servers may include computing hardware such as memories, data storage units, and processors including CPU, GPU, application specific integrated circuit (ASIC), FPGA, and cloud computers. The computing servers may include a single server of processors, a cluster of servers, multiple servers controlled by a central controlling server, or multiple slave servers supporting a master server, among other configurations of a computing server. The computing server may be configured to perform various computing tasks or computational processes such as hosting, training, or using computational models, data storage and processing, and mining cryptocurrency.

The facility 160 includes a field local controller 164 which is in data and power connection with the devices 320. The local controller 164 is in power connection with the devices 320 through a power distribution unit (PDU) 310. The PDU 310 receives power from the field local controller 164 (which is sourced from the energy grid 152 (e.g., through a QSE) or the backup power unit 168 of the facility 160) or directly from the energy grid 152 (e.g., through a QSE) or the backup power unit 168 of the facility 160. The field local controller 164 is in data communication with the PDU 310 to send commands to the PDU 310 (e.g., cut off power to devices 320 or adjust power supply to the devices 320) or receive data from the PDU 310 related to the specifications and status of power supplied to the devices 320. The local controller 164 is in data communication with the devices 320 to receive data about the devices 320, such as device operational status 332 and device specifications and configurations 336, and to send command signals to the devices 320. The device specifications 336 include name, ID, manufacturer, list of actions or commands applicable to the device, safety and compliance considerations, and standard operation procedures.

The field local controller 164 may be in data communication with individual devices from among the devices 320, such as device_1 321 to device_N 324, or with a batch of devices from among the devices 320, or with the devices 320 as a whole, or a combination thereof. The field local controller 164 is in data communication with monitoring sensors 340 in the facility 160 that are configured to monitor operational status of the facility 160 or the devices 320. Monitoring sensors 340 may include temperature, humidity, pressure, voltage, current, optical camera, and/or infrared sensors or units that carry such sensors, for example, drones or mobile autonomous robots.

In an embodiment, additional auxiliary controllers (not shown in Figures) are provided to add redundancy to rule and action execution on the devices 320. The auxiliary controllers may be provided in parallel to the main controller 110 or the local controller 164 and may be responsible for executing the rule 190 or the action 196 simultaneously with the main controller 110 or the local controller 164 (i.e., the auxiliary controllers may monitor input signal values, determine whether the trigger criterion is met, and dispatch action signals at the same time as the main controller 110 or the local controller 164). Moreover, the auxiliary controllers may be configured to replace the main or local controllers 110 and 164 automatically or manually in case the main or local controllers 110 and 164 cannot operate or fail to execute the defined rule 190 or the action 196. These additional layers of redundancy may advantageously provide more robust and reliable execution of the rules and their corresponding actions.

In an embodiment, the auxiliary controllers may be co-located with the main controller 110 or the local controller 164, or may be located in a different location with respect to the main controller 110 or the local controller 164

In an embodiment, the main controller 110 is a local controller within a field facility 160 or is a remote controller (e.g., a controller in a cloud computing server). In an embodiment, all or a portion of the devices 320 is directly connected to the main controller 110 instead of being connected to the local controller 164. In an embodiment, the main controller 110 delegates the rule and action execution to the local controller 164 or the auxiliary controllers, for all the devices or for a group of devices. In yet another embodiment, the main controller 110 delegates the rule and action execution of a first group of devices to the local controller 164, while delegating the rule and action execution of a second group of devices to the auxiliary controllers, and optionally keeping responsibility for the rule and action execution of a third group of devices for the main controller 110.

As described above with respect to FIGS. 1A and 1B, once a defined rule 190 is generated, such generated defined rule 190 is commissioned for rule execution. Execution of the rule means instructing a controller (e.g., the main controller 110, a local controller 164) to monitor or track values related to the signal type 192 and execute the action 196 (or dispatch the action 196 for execution) once the values of the signal type 192 meet the trigger criterion 194. This tracking of the value of the signal type 192, determination of meeting the trigger criterion 194, generating the trigger signal, and dispatching action signals may all be carried out in a single controller or may be distributed across several controllers. For example, tracking the value of the signal type 192, determining whether the trigger criterion is met, and generating the trigger criterion may be carried out in the main controller 110, and executing the action 196 may be commissioned or dispatched to the local controller 164 for execution. According to an embodiment, the local controller 164 is responsible for executing all the foregoing for executing the defined rule 190. In an embodiment, both the main controller 110 and the local controller 164 are responsible for the execution of all the foregoing, which execution may be simultaneous. Executing the action 196 may be carried out by or at the devices 320 (e.g., stopping power consumption by self-shut down of the devices 320), or may be carried out on the devices 320 by external devices such as the PDU 310 (e.g., stopping power consumption by cutting off power from the power supply of the devices 320). Optionally, once an action 196 is dispatched for execution, the execution status of the action 196 is monitored by the local controller 164 or the main controller 110 continuously at a fixed or variable frequency (closed-loop execution of the action 196). In an embodiment, the execution status of the action 196 is monitored on a continuous basis, until the execution of the action 196 is confirmed or until a second rule overrides the execution of the action 196 with another action. The execution status of the action 196 may be monitored by the monitoring sensors 340 or by receiving the device status 332 data from the devices 320.

Figure 4:
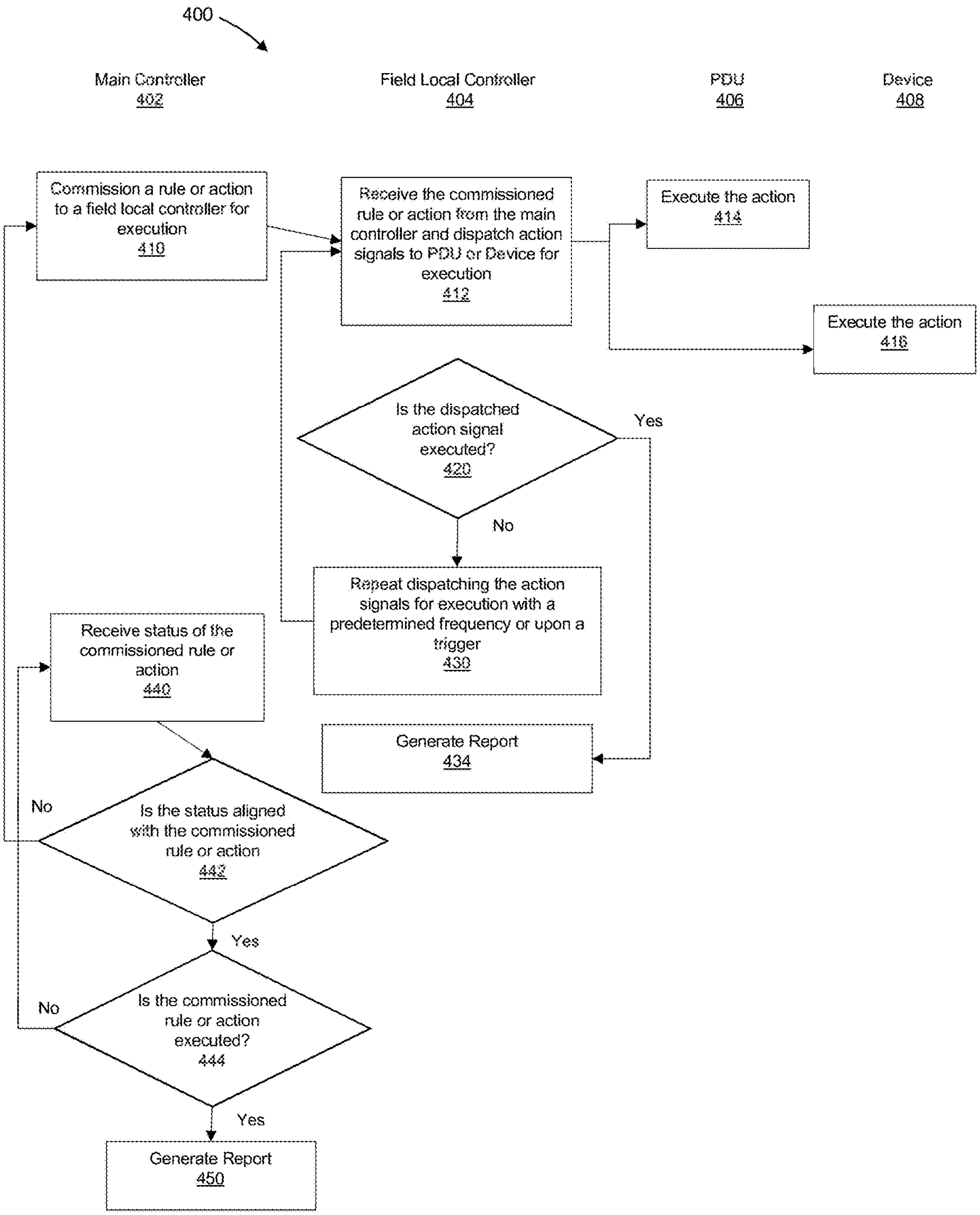
FIG. 4 is a flowchart depicting blocks of code, organized by respective devices implementing the respective blocks of code, for directing the processor circuit of FIG. 2 to control execution of the defined rule of FIG. 1A, according to an embodiment.

Referring now to FIG. 4, shown therein a flowchart representing blocks of code, organized by respective devices implementing the respective blocks of code, for implementation by the main controller 110 and the local controller 164 is shown at 400. At block 410, the main controller 402 commissions a defined rule (such as the defined rule 190 in FIG. 1A) or an action (such as the action 196 in FIG. 1A) to a field local controller 404 for execution. At block 412, the field local controller 404 receives the commissioned rule or action from the main controller 402 and accordingly dispatches action signals to a PDU 406 or one or more devices 408. The dispatching of the action signals may be in accordance with prescribed action dispatching options 198 of the commissioned rule. At block 412, if the local controller 404 receives a defined rule rather than an action, the local controller 404 executes instructions of the method 185 (in FIG. 1B) to determine the action signals first and then dispatch the action signals. If the defined rule instructs action execution on the PDU 406, the action signals are dispatched to the PDU 406 and executed by the PDU at block 414. If the defined rule instructs action execution on the device 408, the action signals are dispatched to the device 408 and executed by the device at block 416. In an embodiment, the defined rule instructs action execution on a variety of devices including the PDU 406 and the device 408 in the same time or in a certain sequence. At block 420, the local controller 404 monitors the execution of the action. This monitoring may be prescribed by the action execution monitoring options 199 as part of the commissioned rule. If the action is determined as executed, the method 400 proceeds to block 434 to optionally generate a report, summarizing the executed action, execution time, and the devices that executed the action, for example. Otherwise, the local controller 404 repeats dispatching the action signals to target devices at block 430. In an embodiment, a first group of devices has executed the action while a second group has not, and thus at block 430 the local controller 404 repeats dispatching the action signals to the second group, thereby preventing dispatching unnecessary action signals and wasting communication resources. The repetition of the dispatching may be prescribed as part of the action dispatching options 198 of the commissioned rule and may include a predetermined frequency (i.e., time interval between each dispatching repetition), a count number (i.e., number of times for total dispatching repetition), or upon a certain trigger criteria (e.g., next occurrence of the trigger criterion 194). At block 440, the main controller 402 receives a status on the execution of the commissioned rule or the execution of the commissioned action. This status report may be received from the local controller 404 or another monitoring device such as from the monitoring sensors 340. At block 442, the main controller 402 assesses the execution status report and determines whether the status is aligned with the originally commissioned rule or action or not (e.g., is the rule or action being executed by the local controller 404 the same as the commissioned rule or action?). If the status is not aligned with the original commissioned rule or action, the method 400 proceeds to block 410 to commission the rule or action and override any misaligned rules or actions in the local controller 404. Otherwise, if the status is aligned, the main controller 402 determines whether the commissioned rule or action is executed or not at block 444. If the commissioned rule or the action is executed, the main controller 402 generates a report (which may be similar to or may include the report generated by the local controller 404) at block 450. In some embodiments, the main controller 402 may be in communication with several local controllers 404 (each controlling their own local devices and PDUs) and commission a plurality of rules or actions to the local controller, and thus the generated report at block 450 may include execution reports from a plurality of local controllers. If the commissioned rule or action is determined to be not executed at block 444, the main controller 402 loops back to block 440 to track and monitor the status of commissioned rule or action.

Figure 5A:
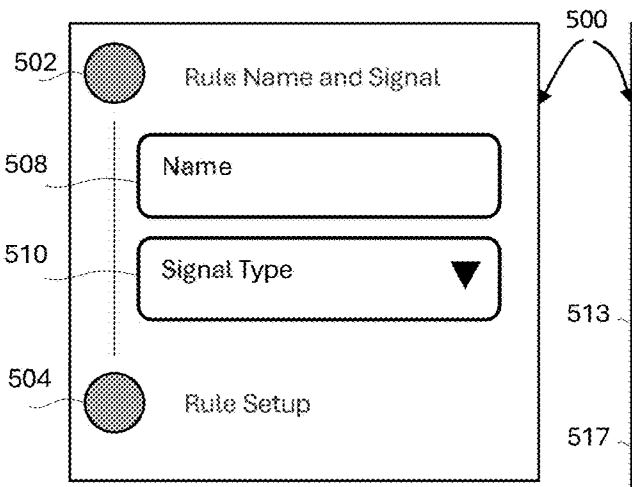
FIGS. 5A and 5B are graphical user interfaces depicting an implementation of the codeless module of FIG. 1, according to respective embodiments.
Figure 5B:
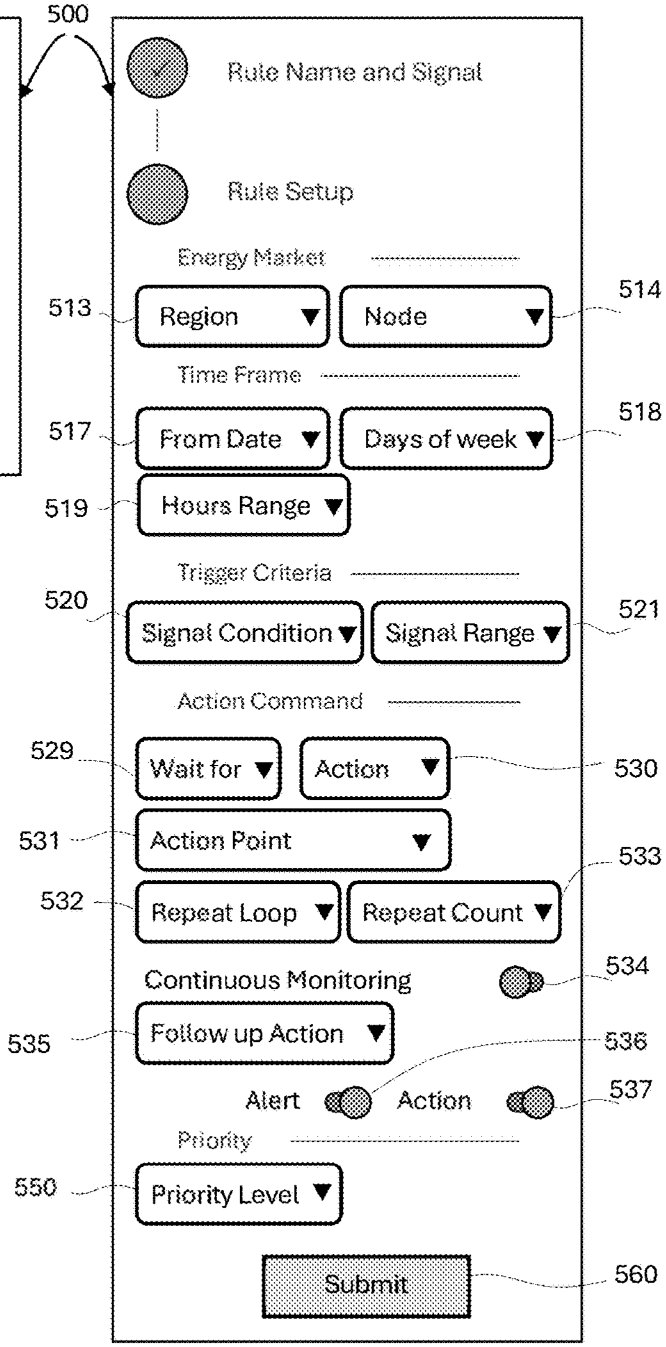

Referring now to FIGS. 5A and 5B, shown therein are graphical user interfaces 500 depicting an implementation of the codeless module of FIG. 1, including a graphic display screen and options of the NCLC module 122, according to respective embodiments. The screen 500 includes a plurality of fields and menus to instruct the user to define a rule 190 using a codeless approach. The screen 500 includes a field for choosing a name 508 and an input signal type menu 510 for choosing a signal type 192. The user selects the input signal type 192 from the input signal type menu 510 to proceed in the rule definition. The selected input signal type 192 determines what input signal values should be collected or monitored (either by data pushed to or pulled by the data collection module 140) as part of executing the defined rules. The signal type menu 510 may include input signal types mentioned under FIG. 1A.

For some signal types 192 (such as breakeven, environmental impacts, or product cost) a follow up menu (not shown in the Figures) or option may be displayed to the user to select a signal processing method. For example, the selected input signal type 510 may be used as raw data, processed on a per device basis or a batch of devices (i.e., subaccount). For some signal types (such as coincidental peak detection), multiple signal processing methods may be selected such as backward or forward detection. Backward detection may be calculated by a ratio of current demand over peak realized demand. Forward detection may be calculated by a ratio of current demand over peak realized and forecast demand. The further processing on the input signal type values is done in the data processing module 144, for example. The signal processing method may further include a frequency at which the input signal values are to be received, a sampling rate of the input signal values, receiving a continuous stream of the input signal values, receiving the input signal values intermittently or at certain time intervals, receiving the input signal values by sending a signal pull request, and receiving the input signal values by receiving a signal push request.

Once the signal type 192 is selected by the user, the screen 500 prompts the user to proceed to rule setup 504. Under the rule setup 504, the screen 500 prompts the user to select information related to the trigger criterion 194 and the action 196. The options displayed to the user at 500 under the rule setup 504 may be dependent on the selected input signal type. The user may define a signal condition 520 and a signal threshold 521. The signal condition may include an operand such as greater than, less than, equal to, equal and greater than, and equal and less than operands. By selecting the signal condition 520 and the signal range (or threshold) 521, the trigger criterion 194 is defined by the user. Depending on the selected input signal type, the trigger criterion 194 may further include a time frame or time window within which the input signal values are monitored. For example, if device uptime is selected as the input signal type 192, the time window within which the trigger criterion 194 is to be met may be set by the fields 517, 518, and 519. In an embodiment, the trigger criterion 194 includes the frequency or a period of time within which a signal condition 520 is to be met. For example, the trigger criterion 194 may include triggering the rule if the uptime values are more than the threshold 521 twice during a certain time frame or if the uptime values are more than the threshold 521 for a certain period of time (e.g., 15 minutes). More generally, the trigger criterion 194 may include occurrence of an event and the event may be defined by an operand that compares the values of the selected signal type with the signal range (or threshold) 521, by the number of times the event is occurred or repeated, the frequency at which the event is occurred, or the time period for which the event has been happening. In an embodiment, the event includes determining whether the input signal values follow a certain pattern or a temporal shape (e.g., a sine wave or alternating positive and negative values within a certain timeframe). In an embodiment, the trigger criterion 194 includes the occurrence of a plurality of events. For example, if the input signal value follows a square wave and if the maximum value of the square wave is above the threshold 521. A Boolean operand or other combinatory operands may be used to combine occurrences of single events for the definition of the trigger criterion 194.

For some input signal types such as energy price, the user is prompted with fields 513 and 514 to select the region and node of the desired energy market for which the energy price values are to be monitored. A plurality of regions 513 may be selected by the user. For example, for North American markets, whose regions may include: ERCOT, CAISO, IESO, ISONE, MISOENERGY, NYISO, SPP, AESO, PJM. Energy nodes 514 may include local energy grid points, for example in ERCOT region, nodes 514 may include LZ_WEST, MARBFA, MARIAH_ALL.

Under the rule setup 504, the screen 500 further prompts the user to select information related to the action 196. The user may select an action from the action menu 530. The user may also be prompted to select an action point (i.e. where the action is to be executed, e.g. devices 320 or PDU 310) from an action point menu 531. The action point menu may include a list of all device types (e.g. PDU, computing servers, hydrogen electrolyzers) or devices (e.g., all computing servers identified by their serial number) connected to the codeless device management system 100, from which the user may select the action point. In an embodiment, the action point menu 531 allows the user to filter or group-select action points using various attributes associated with the devices. For example, the user may select or filter devices based on a specific device model (e.g., device brand, manufactured year), device location, internet protocol (IP) address range, serial number range, or certain tags associated with the devices (e.g. repaired devices, brand new devices). The actions may be actions for execution by the device 320 itself such as overclocking or underclocking the processor of the device 320 or increasing speed of a fan. Alternatively, the actions may be actions for execution by external devices (such as PDU 310 or other external controllers) to the devices 320. Such actions include cutting power off to the device 320, changing the environment at which the device 320 is operating (e.g., reducing the temperature at which computer servers are working). More generally, the actions may be selected from: stopping the operation of the devices, starting the operation of the devices, adjusting the operation of the devices (including power consumption of the devices), and sending an alert or notification to a user. Stopping the operation of the device 320 may include hibernating (i.e. putting devices to sleep mode or on stand by, by for example stopping main processes without shutting down the device), cutting an input supply to the device to affect (e.g., stop) the device product production (for example in computing server devices, cutting input supply may include cutting input workloads or computing tasks, or in hydrogen electrolyzing devices this may include cutting the supply of water or methane to the electrolyzer), shutting down the power to a single device, or shutting down the power of a group of devices or all of the devices or the whole facility providing the power to the devices.

Starting the device may include resuming the device (e.g. resuming the device from hibernation or standby), re-establishing the input supply to the devices for the production of the device products, or starting the device from full shutdown. Adjusting the operation of the device may include adjusting power consumption by one individual device from a group of devices, or power consumption of a group of devices, adjusting a rate at which the device is producing the device product, adjusting a supply rate of the input supply to one or more devices, cutting power supply to a device or a group of devices from the one or more devices, or hibernating a device or a group of devices from the one or more devices.

The stopping action may include recording a last state (e.g. energy management settings, health management settings, tasks being done on a device or the specific element of a sequence of tasks being done by a device) and a checkpoint of the one or more devices in a memory (e.g. memory of main controller 110 or local controller 164, or any other memory). The starting action may further include recalling the recorded last state or the checkpoint from the memory. The stop action command may allow the device to record the last state and the checkpoint before the device gracefully shuts down (i.e., soft shutdown) by itself. For example, in case of computing server devices, if a computing server is training an artificial intelligence (AI) model while a graceful or soft stop action signal is dispatched to the device, the computing device may record the latest state of the AI training (e.g., the number of epochs, the values for the trained AI model weights, or a number of training datasets used up to the stop time) and establish a checkpoint on the latest training dataset used for training the AI model. Then the computing server may perform a soft shutdown (i.e., graceful shutdown) to stop its operation. In the same example, once the computing server receives a start action signal, the computing server may use the recorded last state or the checkpoint in the training dataset to resume training the AI model. In an embodiment, the last state or the checkpoint is further recorded in a central server or memory, and the start or resume action signal is dispatched to an alternative computing server along with the recorded last state and checkpoint, so that the alternative computing server resumes training the same AI model. In further embodiments, the user selects further attributes for the graceful stop action signal. For example, the user may select a deadline for the device to execute the soft shutdown. For example, the dispatched stop action may request the device to gracefully stop operations at 4 pm of a certain day. A further action attribute may include a buffer time which prescribes a time before the deadline time for which the device is to record the last state and the checkpoint. In further embodiments, the attribute additionally includes a follow up action with a follow up action time, prescribing the device to execute the followup action at the followup action time after the graceful stop action. For example, the user may define a rule for the device to perform a graceful stop action within 4 pm to 6 pm of a certain day and setting a buffer time of 60 minutes. Once the graceful stop action is dispatched to the device, the device records the last state and the checkpoint within 60 minutes before the deadline (4 pm) and gracefully shuts down before the deadline (4 pm), while recording the last state and the checkpoint on the device's memory or a central server (local or remote). The device resumes operation after 6 pm by recalling the last state and the checkpoint from its memory or from the central server.

In an embodiment, once the selected action is power adjustment, a further menu is displayed to the user to configure device settings, related to their power consumption, among a list of available device settings. For example, the user may choose among builds and models of devices and further set their power adjustment settings (e.g. select a low-power mode associated with a low specified kW consumption range, normal-power mode associated with a medium specified kW consumption range, and high-power mode associated with a high specified kW consumption range). In some examples, fuzzy or continuous power adjustment modes or settings may be available. A similar menu with similar settings may be displayed to the user if the action is selected as adjustment to device product production rate, but only with settings or configurations related to device product production rate (e.g., low production rate associated with a low device product production rate range or threshold). In both cases of adjusting power consumption or adjusting device product production rate, the screen 500 may display options to the user to select a target power consumption or device product production rate range or threshold and enable the user to further choose an individual device, a group of devices, or all of the connected devices to be adjusted to reach the indicated range or threshold. According to an embodiment, the screen 500 may display adjustment options (e.g., range and threshold) related to power production or material production of a facility that provides input power or input material supply for the one or more devices. For example, the user may be able to select a range or threshold for a power generation plant that supplies energy to the devices, or similarly may be able to select a range or threshold for produced water or methane, in a production facility, that are supplied to hydrogen electrolysis devices.

In an embodiment, the rule setup 504 further includes an action attribute menu (not shown in FIG. 5B) to enable the user to select the action attributes 197 of the selected actions in 530. From the action attribute menu, the user selects a duration (indicating the duration at which the action is to be executed on the action point), a frequency (indicating the number of times the action is to be executed on the action point), and an execution rate (indicating the rate at which the action is to be executed on the action point), of the selected action in 530 (e.g., reduce power consumption for 30 mins, shut down devices twice per day, or reduce power consumption by 30% in 10% decrements and over 90 minutes). The action execution duration may be indicated by a certain timeframe or until the action or the defined rule is overridden by a second action or a second defined rule. The action execution rate may include a change rate in the energy consumption of the action point, or a change in the product production rate, or combination of both changes. The change rates indicated by the execution rate may be selected to be different for different devices. For example, the action execution rate may include a first change for a first group of devices in the action point and a second change for a second group of devices from the action point. In an embodiment, the action attribute menu includes a condition and a threshold depending on the selected action. For example, in case power adjustment or product production adjustment are selected as the action, the action attribute may further include an operand (e.g., more than, less than or equal to) as the action condition and a number to represent a threshold or range (e.g., power consumption range, product production rate range, power consumption percentage). For example, the user may specify to adjust power consumption of the devices to bring the overall power consumption below 30 MW·hr or below 40% of the maximum power consumption of the facility. In an embodiment, a priority level of an action may be part of the action attributes 197 and selected by the user from the action attribute menu.

The user may select continuous monitoring of the execution status of the action 196 by activating the continuous monitoring button 534. The continuous monitoring button 534 may be part of an action execution monitoring menu (not separately shown in FIG. 5A) to enable the user to select the action execution monitoring options 199. The action execution monitoring menu may further include a sampling rate or frequency of the action execution state. The screen 500 may further prompt the user to optionally select a repeat frequency 532 and a repeat count 533 in case of failure of execution of the selected action. Additionally, a similar repeat functionality may be considered for the execution of the action. For example, the user may select to have an action repeatedly or continuously executed on a device until a result is reached, until a higher priority follow-up action is dispatched for execution, or until a criterion (such as duration of action execution, or number of times the action is executed) is met. The screen 500 may further prompt the user to select a buffer time or wait time 529 which determines a time interval between when the trigger criterion is met and when the action signal is to be dispatched. In an embodiment, the buffer time 529, repeat loop 532 and repeat count 533 entries are part of an action dispatching menu which enables the user to select action dispatching options 198. The action dispatching menu may further include a ramp time for dispatching the action signals, a deadline for dispatching the action signals, and/or a deadline for completing execution of the selected action.

The repeated monitoring of the execution status and sending of action dispatch signals advantageously ensures that the desired and selected action is executed, further ensuring that, if an action is being desirably executed while the device is being altered by another computer program or a user, the device management system 100 keep pushing for the execution of the desired action even after modification to the device.

Additionally, the screen 500 may prompt the user to optionally select a follow up action from the follow up action menu 535. In an embodiment (not shown in the Figures), the user may select continuous monitoring of the execution status of the action on an ongoing basis until execution of the action is confirmed or until a second defined rule with a higher priority is sent to the device that overwrites the previous rule.

The screen 500 may also prompt the user to optionally select whether the selected action is to be actually executed on the action point 531 by activating the action button 537, or whether an alert is to be received once the trigger criterion is met by activating the alert button 536, or both.

The screen 500 may also prompt the user to optionally select a priority level for the defined rule 190 from a priority level menu 550. The priority menu 550 may include priority levels indicated by a number (e.g., a priority level may be denoted by a priority number, with the priority level indicated by ascending order, where larger numbers have higher priority, or by descending order, where smaller numbers have higher priority) or by a phrase (e.g. low, medium, or high priority) or by any other means. The selected priority level may help the main or local controllers 110 and 164 in determining which defined rule to be prioritized in case multiple defined rules are being commissioned for execution. In an embodiment, a defined rule with a higher priority level number is given higher priority for execution by the main or local controllers 110 and 164. In an embodiment, among rules that have identical priority levels, rules that have a stop action command are given priority to rules with other action commands. In an embodiments, start action commands or other actions commands are given priority over stop action commands among rules with similar priority levels.

In an embodiment, a display 500 further includes a list of all device types (e.g., PDU, computing servers, hydrogen electrolyzers, water pumps) connected to the codeless device management system 100, and prompts the user to select device types that the user wishes to control, prior to the signal type 510 and the rule setup 504 prompts. In such an embodiment, once the device types are selected by the user, the signal type menu 510 and the rule setup menu 504 automatically populate with various entry fields according to the selected device type. For example, if the user selects computing servers, the signal type menu and the rule setup menu 504 (including trigger criterion and actions) display data related to computing servers only.

In a further embodiment, the values displayed to a user in each field 510 to 550 are dynamically and automatically updated or modified according to a type or types of field facility 160, energy supply 150, and other data source 156 connected to the codeless device management system 100.

For example, if a new node is added to an energy grid 152, the field 514 automatically displays the new node to the user for potential selection by the user. In a further example, if a power generation (e.g., BTM) unit is added to a field facility 160, signal types such as energy mix may be added to the signal type menu 510.

Figure 6A:
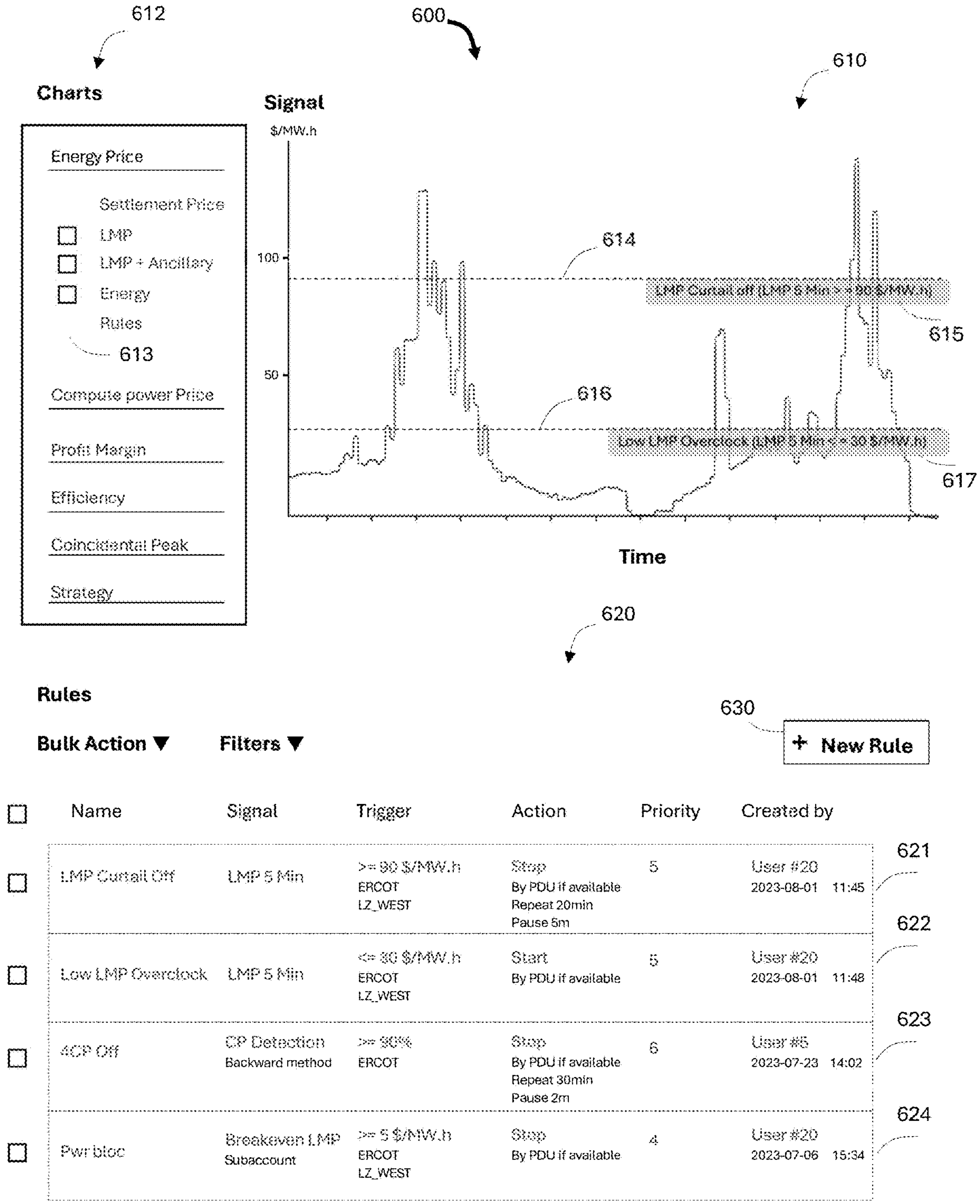
FIGS. 6A and 6B are graphical user interfaces depicting an implementation of the chart module of FIG. 1 and a user dashboard, respectively, according to one embodiment.

Referring now to FIG. 6A, a graphical display 600 generated at the user interface 120 is shown. The display 600 includes a chart area 610 generated by the chart module 124. The chart area is configured to visualize values of various input signal types over time. For example, the chart area 610 shown in FIG. 6A displays values for an input signal type called “settlement price” on the y-axis over time on the x-axis. The settlement price values indicate energy prices in $ per MW·h. The input signal types whose values are to be displayed on the chart area 610 may be selected by a user from a chart menu 612 of the display 600. The values over time for the input signal types checked on the chart menu 612 are visualized on the chart area 610. The input signal types on the chart menu 612 may be categorized according to the nature of the input signal types. For example, input signal type related to energy price (such as settlement price and LMP) are grouped together in FIG. 6A. The chart menu 612 may also include a “Rule” option 613 which when checked causes to be displayed all the defined rules related to a category of input signal types, on the chart area 610. The displayed horizontal line 614 and information box 615 represent defined rule 621, while horizontal line 616 and information box 617 display information related to defined rule 622. In the embodiment shown in FIG. 6A, the boxes 615 and 617 indicate the trigger criteria of the defined rules 621 and 622. The horizontal lines 614 and 616 visualize signal trigger thresholds. However, in other embodiments, signal trigger thresholds may be vertical or a time-varying non-linear curve (e.g. for breakeven thresholds). Once the “Rules” option is checked and a new rule is defined in the rule management module 116, the chart module 124 is configured to display the defined rule on the chart area 610. In an embodiment, once an action is executed, the executed action is displayed on a corresponding chart. For example, once the defined rule 621 is triggered, the corresponding stop action is commissioned for execution, and once the stop command is executed, the stop action is displayed on the chart (for example a label vertically erected from the “time” axis” at the time of execution, and showing “stopped the PDU” in a label box).

The display 600 further includes a list of the defined rules 621 to 624 at a rule area 620. Each defined rule 621 to 624 may be similar to the defined rule 190 discussed previously with respect to FIG. 1A. For each defined rule 621 to 624, various metadata or high-level information of the defined rule may be summarized. For example, according to the embodiment shown in FIG. 6A, the rule name, the selected input signal type, trigger criteria, the selected action, the priority level, and the user who has created the rule in addition to the time when the rule was created, are displayed for each rule 621 to 624. In an embodiment, the rule area 620 further includes a menu or a button for each defined rule 621 to 624 that enables modification to or of each defined rule. Additionally, the rule area 620 may include one or more buttons related to each defined rule 621 to 624 that enable a user to quickly activate or deactivate the action related to each respective rule or switch the action to merely send an alarm or notification rather than perform an actual action on a device. Moreover, the rule area 620 may include historical data related to the creation and execution of each defined rule 621 to 624.

Figure 6B:
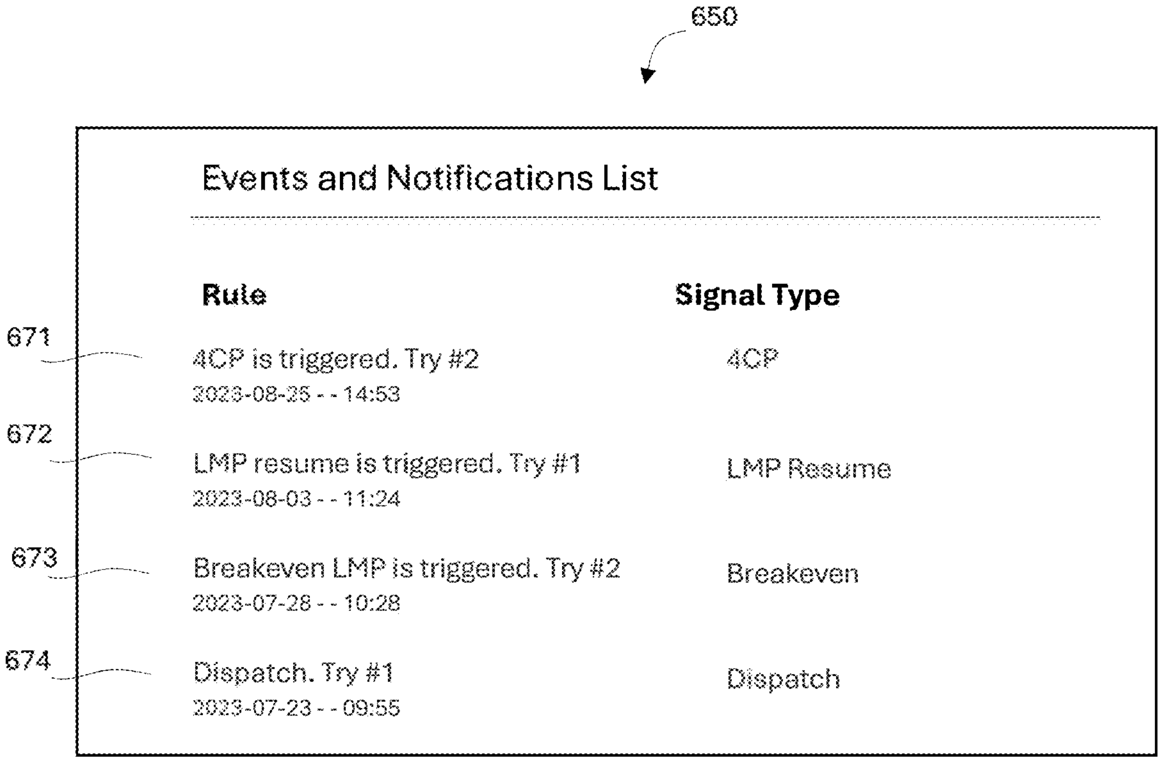

Referring to FIG. 6B, another graphical display 650 generated at the user interface 120 is shown. The graphical display 650 presents a generated report of occurred or executed events and notifications. The generated report includes a list of triggered rules 671 to 674 with information regarding the time of their execution, their signal type, and the number of times the action signal was dispatched (e.g., rule executed on try #2).

The following sections provides several illustrative examples and scenarios where the disclosed codeless device management system 100 may be used.

Example 1—Device Uptime Management

In some scenarios, a user is interested in managing the uptime of a plurality of devices within a field facility 160 (e.g., datacenter 162). The field facility 160 may be a participant in ancillary services or emergency response services (ERS) of a grid operator through a QSE and may be required to have at least 95% of uptime during Mondays and Tuesdays within a certain calendar period. The user may define a rule to facilitate compliance with this obligation by selecting uptime from the signal type menu 510, followed by selecting the corresponding time windows 517 to 519, and selecting the “less than” operand from signal condition menu 520 and 95% in the signal range field 521. The user may further select the action as sending a start command to one or more devices (e.g., computing servers) from the action menu 530. The priority level of the rule may be selected to the highest level from the priority level menu 550, to override other rules with an stop command action. This defined rule facilitates compliance to the obligation by commanding energy consumption and uptime in cases when the uptime falls below 95%. The user may further determine other rule parameters related to execution of the action, such as ramp time for dispatching the action signals, monitoring the execution state of the action, and provisions for repeating dispatching of the action signals. For example, the user may select the rule to retry sending (or dispatching) the action signals within certain time intervals, if the execution of the action is failed. The number of retries may further be set by the user. Ramping of the action signals may be stepwise for a batch of devices at certain intervals. For example, the user may select to start 10 devices at a time and wait for 30 seconds before sending commands to the next batch of devices. The ramping of action signals may further follow a deadline. For example, the user may select to have all devices receiving the start action signals within 5 minutes. In this case, if dispatching action signals in ramping fashion takes longer than 5 minutes, a dispatch action signal is sent to all the remaining devices at once. In other words, the ramping is effective within the first 5 minutes only.

Example 2—Management of Devices Based on Energy Prices

In some scenarios, it is desirable to monitor energy prices and operate devices accordingly. In this example, the user is interested in monitoring LMP-5 min prices and stopping or reducing power consumption of devices once the energy prices are more than $80/MW·h. In such scenarios, the user may select LMP-5 min energy price from the signal type menu 510. In the rule setup 504 section the user may select the region and node 513 and 514 from which the energy prices are to be tracked. The user may select “more than” in the signal condition field 520 and the target threshold as $80/MW·h in the signal range field 521. The user may select to stop or adjust power consumption. Power adjustment may differ from one device type to another (e.g. compute power adjustment in case of datacenters, speed and input voltage adjustments for actuators, and temperature adjustments for cooling devices). In case of stop action command, the user may choose the action point as the device itself or PDU, or both depending on the availability. In some scenarios, the user may activate the alert button 536 so that the user is automatically notified once the trigger criterion is met.

Example 3-Management of Devices Based on Grid Dispatch Signals

Grid or microgrid dispatch signals are very important signals that are communicated to a controller of a field facility by an operator of the grid or microgrid (e.g., a QSE) and may include commands to curtail or ramp up energy consumption of the facility. The dispatch commands may be related to various programs introduced by an energy grid. The dispatch signal may include important instructions to be used in a defined rule. For example, the input dispatch signal may include: reducing energy use by 30% between 11 am to 5 pm on a specific day, raise minimum energy consumption to 1 MW for next Monday, or reduce maximum energy consumption to 10 MW between 10 am to 12 pm. Complying with dispatch signal commands is important for the reputation of the facility and avoiding incurring penalty fees. Thus, the user may define a rule to automatically comply with received dispatch signals, by selecting dispatch signal from the signal type menu 510. The grid regions or the available programs by the power grid may be displayed to the user to choose from, and the user may choose one or more such programs. Since no trigger criterion is needed and the actions and time frames may be automatically extracted from the command which is communicated in the dispatch signal, the user may only define the action dispatching options (e.g., amount of buffer time before and after the time window prescribed by the dispatch signals) and the action execution monitoring options (e.g., continuously monitor the state of the action execution.

Example 4—Schedule Action

In some scenarios, the user may be responsible for executing a prescheduled action in a specified time frame. For example, the user may have been awarded an incentive, as part of an ancillary service program, to maintain energy usage above 10 MW on a Monday from 10 am to 3 pm. In such a case, the user is responsible for the execution of the obligation in order to be entitled for the incentive program. The user may define a rule to automate the obligation under the ancillary service program by selecting scheduled action from the signal type menu 510 and choosing the designated time frame. The start time may be earlier than the specified 10 am or may be just in time for proper execution of the obligation. The action may be chosen as starting a certain percentage of devices. Assuming that the facility uses 20 MW at full capacity (i.e., when all devices are up and running), the action may be chosen to start 55% of the devices, thereby bringing the overall power consumption above 10 MW in total. Alternatively, the user, instead of starting a percentage of devices, may choose to select power adjustment as the selected action for the action menu 530 and set the devices to adjust power consumption such that they consume more than 10 MW in total. In some cases, the main controller 110 may determine multiple methods to reach the selected target power adjustment by the user. For example, the methods may include scaling up the power consumption levels of all devices to a high-power mode from a normal-power mode, or scaling up a portion of devices to the high-power mode, while maintaining the power consumption at low-power mode in another group of devices, or by simply scaling up power consumption in all devices equally to a level for which the total energy consumption by all devices reaches above the 10 MW target. The main controller 110 may use an optimization method to calculate an efficient method to reach the selected target power adjustment.

Example 5—Using a Mix of Rules for Managing Devices

A user may combine multiple rules to manage devices for various trigger input signals with various priority levels. For example, the user may define a first rule to manage profit margins generated by the devices and may send stopping or scale-down power adjustment action signals to all or a group of devices once the profit margin values reach below a certain threshold (e.g., 40%). This first rule may have a priority of level 4. A second rule may be defined for health management or maintenance of the devices with a higher priority level of 5. For example, the second rule may indicate stopping devices that heat up above a critical temperature level, or devices that generate frequent error codes. In normal operations, the first rule is triggered and executed, and the second rule will override the first rule once the second rule is triggered. A third rule may be to execute a scheduled action for curtailing energy consumption with a priority level of 6. The schedule action has higher priority over the first and second rule and will override both of them in case it is triggered. A fourth rule may be defined to comply with a dispatch signal coming from a grid operator. The fourth rule may have a priority level of 7 to override all the other rules once a dispatch signal arrives at the codeless device management system 100.

In the examples mentioned above, the user selects the action points or devices on which the rules are applied. The action points may be selected among energy consuming devices and other peripheral devices such as PDUs and cooling systems. The user selects to apply the above-mentioned actions to each device, to a group of devices, or to all devices connected to a controller (e.g. the main controller 110 or local controller 164). In yet another example, the user may have a first set of rules defined specific to a first group of devices, a second set of rules directed to a second group of devices, and a third set of rules directed to both the first and the second groups of devices.

All the ranges that are mentioned throughout this disclosure may include an upper limit and/or a lower limit.

The codeless programing and device management tools defined throughout the present disclosure may be presented and used by one user or a group of users. Each user may define one or more defined rules 190. The rules defined by one user may be editable or viewable by other authorized users.

While specific embodiments have been described and illustrated, such embodiments should be considered illustrative only and not as limiting the disclosed embodiments as construed in accordance with the accompanying claims.

The invention claimed is:

1. A computer program product comprising a non-transitory computer readable storage medium storing computer executable instructions thereon that, when executed by a computer, perform the following operations for controlling energy consumption of a datacenter:

generating a display screen for programming one or more devices in the datacenter, the display screen configured to provide instructions on defining a rule by displaying:

an input signal type menu comprising one or more input signal types, a trigger criterion menu comprising one or more trigger criteria; and an action menu comprising one or more actions for execution on the one or more devices;

creating two or more defined rules by receiving an input signal type selected from the input signal type menu, a trigger criterion selected from the trigger criterion menu, and an action selected from the action menu, wherein each rule has an associated priority; and commissioning the defined rules for execution on the one or more devices according to the priority associated with each rule, comprising:

dispatching action signals corresponding to the selected action to a plurality of target devices associated with the selected action;

receiving execution state data from the plurality of target devices or from a local controller associated with the plurality of target devices, the execution state data indicating, for each target device of the plurality of target devices, whether the selected action has been executed by the respective target device;

determining, from the execution state data, that a first subset of the plurality of target devices has executed the selected action and that a second subset of the plurality of target devices has not executed the selected action; and re-dispatching the action signals only to the second subset of the plurality of target devices;

wherein the defined rules are configured to automate operating the one or more devices, and wherein operating the one or more devices comprises adjusting energy consumption of the one or more devices.

2. The computer program product of claim 1, wherein commissioning the defined rules for execution comprises:

receiving input signal values of the selected input signal type;

monitoring the input signal values to determine that the input signal values meet the trigger criterion; and once the trigger criterion is met, dispatching action signals for executing the action on the one or more devices.

3. The computer program product of claim 1, wherein operating the one or more devices further comprises one or more of: sourcing energy to the one or more devices, trading energy allocated to the one or more devices, monitoring and/or maintaining the health or operating conditions of the one or more devices, monetizing energy allocated to the one or more devices, and complying with or executing a contractual agreement or an option agreement in relation to operating the one or more devices.

4. The computer program product of claim 1, wherein the one or more devices consume energy to generate a device product measured by a product signal, and wherein the input signal type menu comprises any one or more of the product signals, a product price signal, a product production cost signal, a product profit margin signal, a breakeven signal, and a breakeven efficiency signal.

5. The computer program product of claim 1, wherein the trigger criterion menu comprises any one or more of a time frame within which the input signal values are monitored, a signal condition, a signal threshold, a signal range, and an energy market for which values for the selected signal type are monitored.

6. The computer program product of claim 5, wherein the signal condition comprises a conditional statement comprising an operand that compares values of the selected signal type with the signal threshold or the signal range.

7. The computer program product of claim 1, wherein the action menu further comprises an action point menu, comprising one or more action points, and wherein creating the defined rules further comprises receiving an action point selected from the action point menu.

8. The computer program product of claim 7, wherein the action menu further comprises an action dispatching menu comprising one or more action dispatching options configured to prescribe a method of dispatching the action signals to the selected action point, and wherein creating the defined rules further comprises receiving an action dispatching option selected from the action dispatching menu.

9. The computer program product of claim 1, wherein the action menu further comprises an action attribute menu comprising one or more action attribute options configured to prescribe an attribute of the action, and wherein creating the defined rules further comprises receiving an action attribute option selected from the action attribute menu.

10. The computer program product of claim 1, wherein the display screen further displays a priority menu comprising one or more priority criteria, wherein creating the defined rules further comprises receiving a priority criterion selected from the priority menu as the associated priority, wherein the priority criterion is a priority level selected from a list of priority levels, wherein the priority level is denoted by a priority number, with the priority level indicated by ascending order, wherein larger numbers have higher priority, or by descending order, wherein smaller numbers have higher priority.

11. The computer program product of claim 10, wherein a first defined rule is executed with a higher priority over a second defined rule if the first rule and the second rule have a similar priority criterion but the first rule is defined to cause a reduction in energy consumption of the one or more devices.

12. The computer program product of claim 10, wherein a first defined rule is executed with a higher priority over a second defined rule if the first defined rule and the second defined rule have a similar priority criterion but the first defined rule is defined to cause an increase in energy consumption of the one or more devices.

13. The computer program product of claim 1, wherein the input signal type menu, the trigger criterion menu, and the action menu are dynamically updated.

14. The computer program product of claim 1, wherein the input type signal menu comprises one or more energy consumption signals, and wherein the energy consumption signals include any one or more of uptime measurement signals, energy or power consumption signals, grid or micro-grid condition signals, energy price signals, energy mix signals, and coincidental peak signals.

15. The computer program product of claim 4, wherein the product signals comprise any one or more of product price signals, product production cost signals, profit margin signals, breakeven signals, and breakeven efficiency signals.

16. The computer program product of claim 1, wherein the input type signal menu comprises one or more device signals, and wherein the device signals include any one or more of device health signals, device performance or operational condition signals, and device maintenance signals.

17. A system to control energy consumption of a datacenter, the datacenter comprising one or more energy consuming devices, the system comprising:

a controller operably connected to the one or more energy consuming devices;

a user interface operably connected to the controller and configured to:

display instructions to define a rule, the instructions comprising:

an input signal type menu comprising one or more input signal types, a trigger criterion menu comprising one or more trigger criteria; and an action menu comprising one or more actions for execution on the one or more energy consuming devices;

receive selection inputs, the selection inputs comprising an input signal type selected from the input signal type menu, a trigger criterion selected from the trigger criterion menu, and an action selected from the action menu;

wherein the controller receives the selection inputs from the user interface to generate two or more defined rules, each rule having an associated priority, and commissions the defined rules for execution on the one or more energy consuming devices according to the priority associated with each rule, the commissioning comprising:

dispatching action signals corresponding to the selected action to a plurality of target devices associated with the selected action;

receiving execution state data from the plurality of target devices or from a local controller associated with the plurality of target devices, the execution state data indicating, for each target device of the plurality of target devices, whether the selected action has been executed by the respective target device;

determining, from the execution state data, that a first subset of the plurality of target devices has executed the selected action and that a second subset of the plurality of target devices has not executed the selected action; and re-dispatching the action signals only to the second subset of the plurality of target devices;

wherein the defined rules are configured to automate operating the one or more energy consuming devices, wherein operating the one or more energy consuming devices comprises adjusting energy consumption of the one or more energy consuming devices.

18. The system of claim 17, wherein the controller commissions the defined rules for execution by:

receiving input signal values of the input signal type;

monitoring the input signal values to determine that the input signal values meet the trigger criterion; and once the trigger criterion is met, dispatching action signals for execution on the one or more energy consuming devices.

19. The system of claim 17, wherein operating the one or more energy consuming devices further comprises one or more of: sourcing energy to the one or more energy consuming devices, trading energy allocated to the one or more energy consuming devices, monitoring and/or maintaining the health or operating conditions of the one or more energy consuming devices, monetizing energy allocated to the one or more energy consuming devices, and complying with or executing a contractual agreement or an option agreement in relation to operating the one or more energy consuming devices.

20. The system of claim 17, wherein the input type signal menu comprises one or more energy consumption signals, and wherein the energy consumption signals include any one or more of uptime measurement signals, energy or power consumption signals, grid or microgrid condition signals, energy price signals, energy mix signals, and coincidental peak signals.

21. The system of claim 17, wherein the input type signal menu comprises one or more product signals, and wherein the product signals comprise any one or more of product price signals, product production cost signals, profit margin signals, breakeven signals, and breakeven efficiency signals.

22. The system of claim 17, wherein the input type signal menu comprises one or more device signals, and wherein the device signals include any one or more of device health signals, device performance or operational condition signals, and device maintenance signals.

23. A method to control energy consumption of a datacenter, the datacenter comprising one or more energy consuming devices, the method comprising:

displaying, using a user interface, instructions to define a rule, the instructions comprising:

an input signal type menu comprising one or more input signal types, a trigger criterion menu comprising one or more trigger criteria; and an action menu comprising one or more actions for execution on the one or more energy consuming devices;

receiving, by the user interface, selection inputs, the selection inputs comprising an input signal type selected from the input signal type menu, a trigger criterion selected from the trigger criterion menu, and an action selected from the action menu;

receiving, by a controller, the selection inputs from the user interface to generate two or more defined rules, wherein each rule has an associated priority; and commissioning, by the controller, the defined rules for execution on the one or more energy consuming devices according to the priority associated with each rule, comprising:

dispatching action signals corresponding to the selected action to a plurality of target devices associated with the selected action;

receiving execution state data from the plurality of target devices or from a local controller associated with the plurality of target devices, the execution state data indicating, for each target device of the plurality of target devices, whether the selected action has been executed by the respective target device;

determining, from the execution state data, that a first subset of the plurality of target devices has executed the selected action and that a second subset of the plurality of target devices has not executed the selected action; and re-dispatching the action signals only to the second subset of the plurality of target devices;

wherein the defined rules are configured to automate operating the one or more energy consuming devices, wherein operating the one or more energy consuming devices comprises adjusting energy consumption of the one or more energy consuming devices.

24. The method of claim 23, the method further comprising commissioning the defined rules for execution by:

receiving, at the controller, input signal values of the input signal type;

monitoring, at the controller, the input signal values to determine that the input signal values meet the trigger criterion; and once the trigger criterion is met, dispatching action signals, by the controller, for execution to the one or more energy consuming devices.

25. The method of claim 23, wherein the input type signal menu comprises one or more energy consumption signals, and wherein the energy consumption signals include any one or more of uptime measurement signals, energy or power consumption signals, grid or microgrid condition signals, energy price signals, energy mix signals, and coincidental peak signals.

26. The method of claim 23, wherein the input type signal menu comprises one or more product signals, and wherein the product signals comprise any one or more of product price signals, product production cost signals, profit margin signals, breakeven signals, and breakeven efficiency signals.

27. The method of claim 23, wherein the input type signal menu comprises one or more device signals, and wherein the device signals include any one or more of device health signals, device performance or operational condition signals, and device maintenance signals.

28. A computer program product comprising a non-transitory computer readable storage medium storing computer executable instructions thereon that, when executed by a computer perform the following operations for managing one or more devices:

generating a display screen for programming the one or more devices, the display screen configured to instruct the user to define a rule by displaying:

an input signal type menu comprising one or more input signal types, a trigger criterion menu comprising one or more trigger criteria; and an action menu comprising one or more actions for execution on the one or more devices;

creating two or more defined rules by receiving an input signal type selected from the input signal type menu, a trigger criterion selected from the trigger criterion menu, and an action selected from the action menu, wherein each rule has an associated priority; and commissioning the defined rules for execution on the one or more devices according to the priority associated with each rule, comprising:

dispatching action signals corresponding to the selected action to a plurality of target devices associated with the selected action;

receiving execution state data from the plurality of target devices or from a local controller associated with the plurality of target devices, the execution state data indicating, for each target device of the plurality of target devices, whether the selected action has been executed by the respective target device;

determining, from the execution state data, that a first subset of the plurality of target devices has executed the selected action and that a second subset of the plurality of target devices has not executed the selected action; and re-dispatching the action signals only to the second subset of the plurality of target devices;

wherein the defined rules are configured to automate operating the one or more devices, wherein operating the one or more devices comprises adjusting energy consumption of the one or more devices.

29. The computer program product of claim 28, wherein commissioning the defined rules for execution comprises:

receiving input signal values of the selected input signal type;

monitoring the input signal values to determine that the input signal values meet the trigger criterion; and once the trigger criterion is met, dispatching action signals for executing the action on the one or more devices.

30. The computer program product of claim 28, wherein the input type signal menu comprises one or more energy consumption signals, and wherein the energy consumption signals include any one or more of uptime measurement signals, energy or power consumption signals, grid or microgrid condition signals, energy price signals, energy mix signals, and coincidental peak signals.

31. The computer program product of claim 28, wherein the input type signal menu comprises one or more product signals, and wherein the product signals comprise any one or more of product price signals, product production cost signals, profit margin signals, breakeven signals, and breakeven efficiency signals.

32. The computer program product of claim 28, wherein the input type signal menu comprises one or more device signals, and wherein the device signals include any one or more of device health signals, device performance or operational condition signals, and device maintenance signals.

* * * * *